US010341138B2

(12) United States Patent
Subramanian et al.

(10) Patent No.: US 10,341,138 B2
(45) Date of Patent: Jul. 2, 2019

(54) SPANNING TREE PROTOCOL ENABLED N-NODE LINK AGGREGATION SYSTEM

(71) Applicant: Dell Products L.P., Round Rock, TX (US)

(72) Inventors: Saye Balasubramaniam Subramanian, Tamil Nadu (IN); Ravisekhar Akkineni, Telangana (IN)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 15/590,855

(22) Filed: May 9, 2017

(65) Prior Publication Data

US 2018/0331855 A1 Nov. 15, 2018

(51) Int. Cl.
| | |
|---|---|
| *H04L 12/46* | (2006.01) |
| *H04L 12/709* | (2013.01) |
| *H04L 29/06* | (2006.01) |
| *H04L 12/707* | (2013.01) |
| *H04L 12/703* | (2013.01) |
| *H04L 12/753* | (2013.01) |
| *H04L 12/24* | (2006.01) |

(52) U.S. Cl.
CPC ........ *H04L 12/462* (2013.01); *H04L 12/4625* (2013.01); *H04L 41/30* (2013.01); *H04L 45/22* (2013.01); *H04L 45/245* (2013.01); *H04L 45/28* (2013.01); *H04L 45/48* (2013.01); *H04L 69/12* (2013.01); *H04L 41/0893* (2013.01)

(58) Field of Classification Search
CPC ... H04L 12/462; H04L 41/12; H04L 41/0893; H04L 69/12; H04L 45/245; H04L 41/16
See application file for complete search history.

(56) References Cited

U.S. PATENT DOCUMENTS

| | | | |
|---|---|---|---|
| 9,059,930 B2 | 6/2015 | Janardhanan et al. | |
| 9,288,138 B2 | 3/2016 | Ghanwani et al. | |
| 2011/0222440 A1* | 9/2011 | Phillips | H04L 45/48 370/256 |
| 2014/0153570 A1* | 6/2014 | Balakavi | H04L 45/7453 370/390 |
| 2018/0287820 A1* | 10/2018 | Mayer-Wolf | H04L 12/4645 |

OTHER PUBLICATIONS

Saye Balasubramaniam Subramanian and Senthil Nathan Muthukaruppan, "Spanning Tree Protocol Enabled N-Node Link Aggregation System," Filed May 3, 2017, U.S. Appl. No. 15/586,088, 39 Pages.

* cited by examiner

*Primary Examiner* — Feben Haile
(74) *Attorney, Agent, or Firm* — Haynes and Boone, LLP

(57) ABSTRACT

A STP n-node VLT system includes a first VLT device with a first virtual port, and a second VLT device with a LAG port, a non-LAG port, and a second virtual port coupled to the first virtual port. A STP engine designates the first VLT device as a root bridge and, in response, designates the first virtual port a designated port and the second virtual port a root port. The STP engine then designates a networking device coupled to the LAG port as the root bridge based on it having a higher priority than the first VLT device. Then STP engine then determines that a non-LAG link between the networking device and the second VLT device has caused the redesignation of the second virtual port as an alternate port and the non-LAG port as a root port, and swaps the designations of the second virtual port and the non-LAG port.

20 Claims, 29 Drawing Sheets

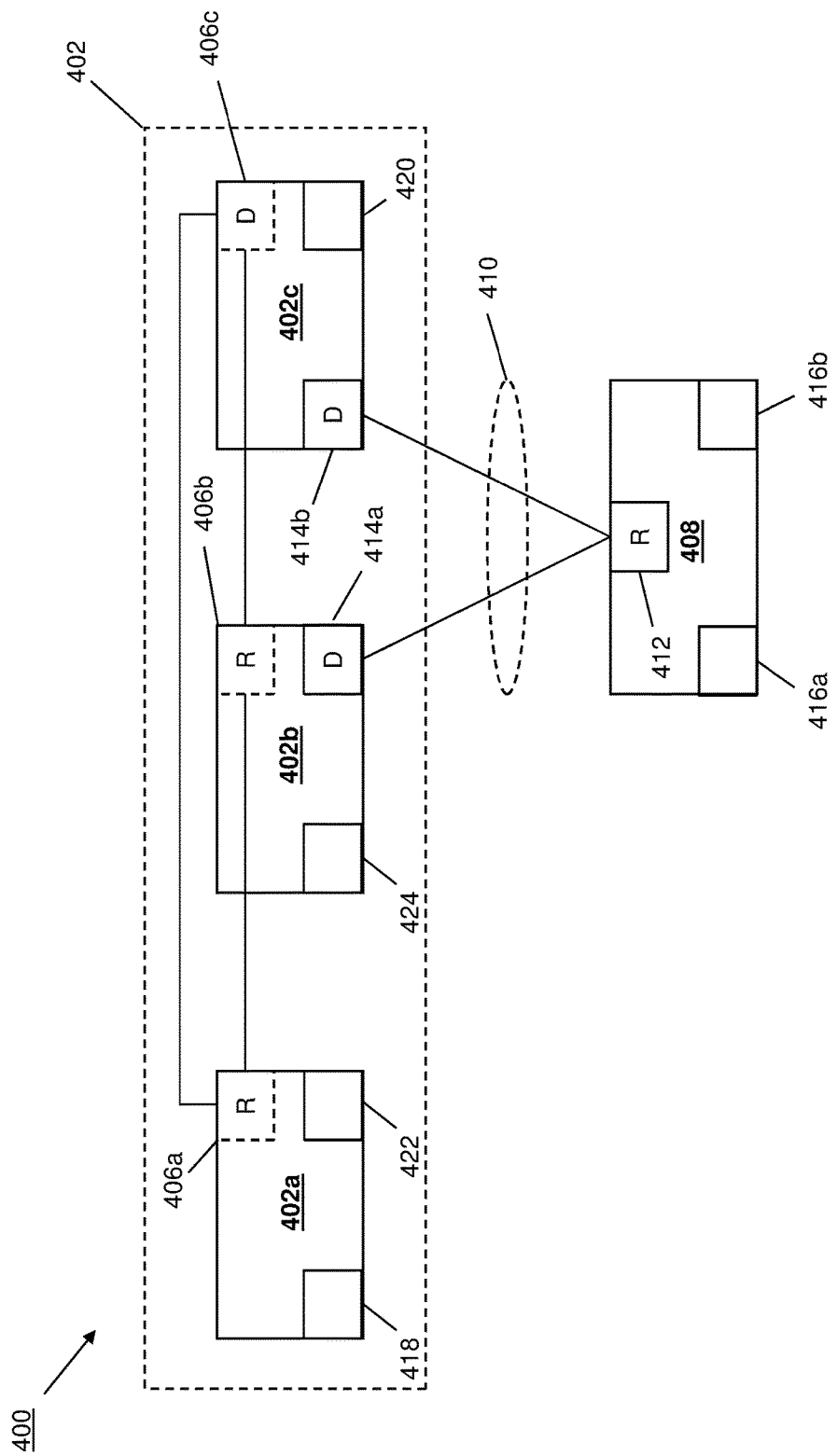

SPANNING TREE PROTOCOL ENABLED N-NODE LINK AGGREGATION SYSTEM

BACKGROUND

The present disclosure relates generally to information handling systems, and more particularly to enabling a plurality of link aggregated node devices to run the spanning tree protocol without blocking inter-chassis links between the link aggregated node devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as switches utilize link aggregation to combine multiple network connections in order to increase throughput, provide redundancy, and/or provide a variety of other link aggregation benefits known in the art. For example, some switches utilize Virtual Link Trunking (VLT), which is a proprietary link aggregation protocol that is provided by the Assignee of the present disclosure and that allows for the setup of an aggregated link to a plurality of different switches. VLT is a layer-2 link aggregation protocol that may be utilized by servers and access switches to, for example, provide a redundant load-balanced connection to the core-network in a loop-free environment, provide uplinks between access switches and core switches, and/or provide a variety of other VLT benefits that would be apparent to one of skill in the art. Conventional VLT provides node level and link level resiliency without the use of the conventional spanning tree protocol, as the use of the conventional spanning tree protocol in place of VLT can result in the blocking of at least a portion of an link between VLT switches, which results in a waste of bandwidth.

However, in some situations, it would be beneficial to block links (as is provided by the conventional spanning tree protocol) to VLT nodes such as the switches discussed above. While VLT nodes generally avoid data loops by forming multi-node link aggregation groups (LAGs), some VLT node configuration can still result in data loops. For example, with reference to the two-node VLT system 200 of FIG. 2, a pair of VLT node devices 202 and 204 may be connected to each other by an Inter-Chassis Link (ICL) 206 (also known as VLT interconnects VLTi's), and may each be part of a VLT LAG 208 to a Top Of Rack (TOR) switch device 210 that is also connected to the VLT node device 202 by a link 212. In another example, with reference to the two-node VLT system 300 of FIG. 3, a pair of VLT node devices 302 and 304 may be connected to each other by an ICL 306, and may each be part of a first VLT LAG 308 to a TOR switch device 310, as well as part of a second VLT LAG 312 to a TOR switch device 314 that is also connected to the TOR switch 310 by a link 316. One of skill in the art in possession of the present disclosure will recognize how the configurations of the two-node VLT systems 200 and 300, as well as the n-node VLT system discussed below with reference to FIG. 4, may result in data loops (e.g., via a data loop provided by the ICL 206, the VLT LAG 208, and the link 212 in FIG. 2.)

N-node VLT systems can support any arbitrary topology (e.g., star topologies, ring topologies, mesh topologies, etc.) for a VLT fabric that includes VLT nodes connected by ICLs. In such n-node VLT systems, a VLT fabric manager may run an ICL loop prevention algorithm and install any appropriate forwarding rules to break loops in the VLT fabric without blocking any of the ICLs between the VLT nodes. However, if the conventional spanning tree protocol is run on such an n-node VLT system, it may operate to block ICLs between VLT nodes. Furthermore, the conventional spanning tree protocol may also block ICLs between the VLT nodes even when there is no data loop in the VLT fabric (i.e., in the VLT nodes connected by ICLs), as if the ICL is part of a data loop (e.g., the ICL 206 that is part of a data loop that includes the VLT lag 208 and the link 212 in FIG. 2), the conventional spanning tree protocol may operate to block that ICL to avoid the data loop. Solving these and other issues would enable the use of the spanning tree protocol to block links in an n-node VLT system in order to address data loops that arise in some VLT node configurations.

Accordingly, it would be desirable to provide a spanning tree enabled n-node link aggregation system.

SUMMARY

According to one embodiment, an Information Handling System (IHS) includes a communication subsystem that provides a Link Aggregation Group (LAG) port, a non-LAG port, and a first virtual port; a processing system that is coupled to the communication subsystem, and a memory system that is coupled to the processing system and that includes instructions that, when executed by the processing system, cause the processing system to provide a spanning tree protocol engine that is configured to: determine that a link aggregation node device including a second virtual port coupled to the first virtual port has been designated as a root bridge and, in response, designate the first virtual port as a root port; determine that a networking device that is coupled to the LAG port has a higher priority than the first link aggregation node device and has been designated as the root bridge; and determine that a non-LAG link provided between the networking device and the non-LAG port has caused the first virtual port to be redesignated as an alternate port and the non-LAG port to be designated as a root port and, in response, redesignate the first virtual port as a root port and redesignate the non-LAG port as an alternate port.

BRIEF DESCRIPTION OF THE DRAWINGS

FIG. 7B is a schematic view illustrating an embodiment of the n-node link aggregation system of FIG. 4B during the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
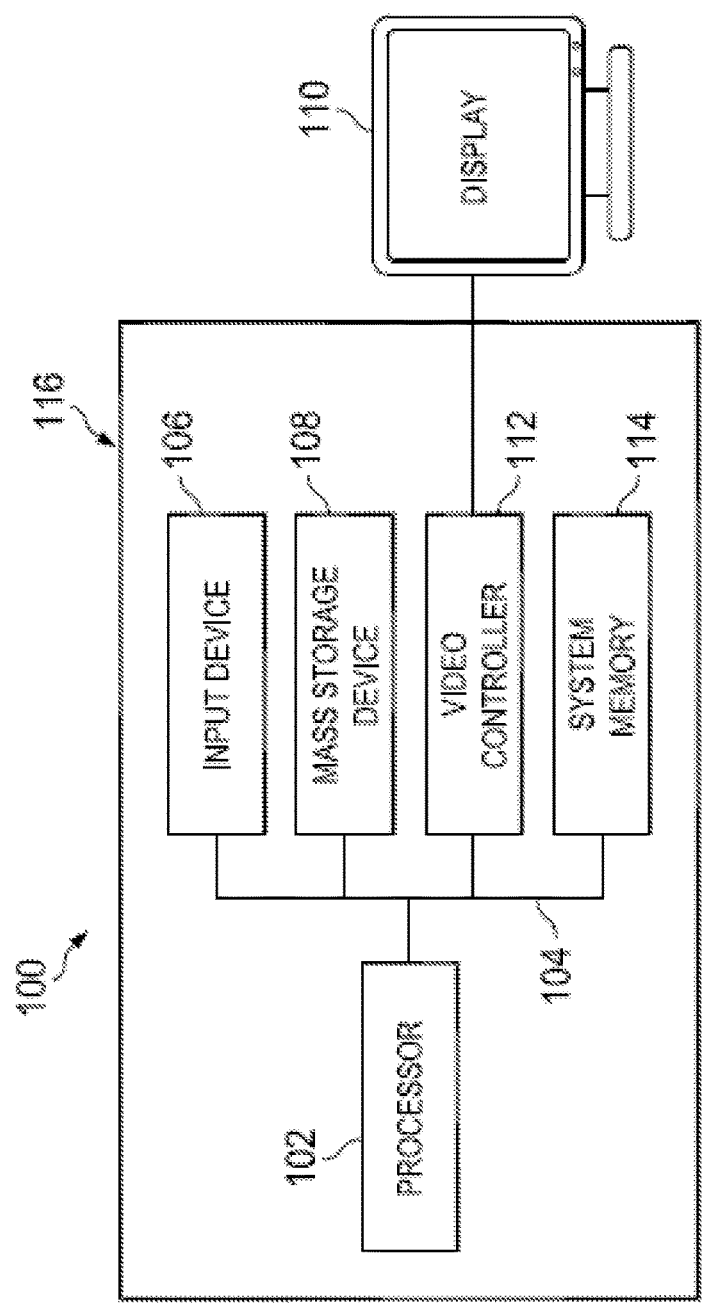
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 4A:
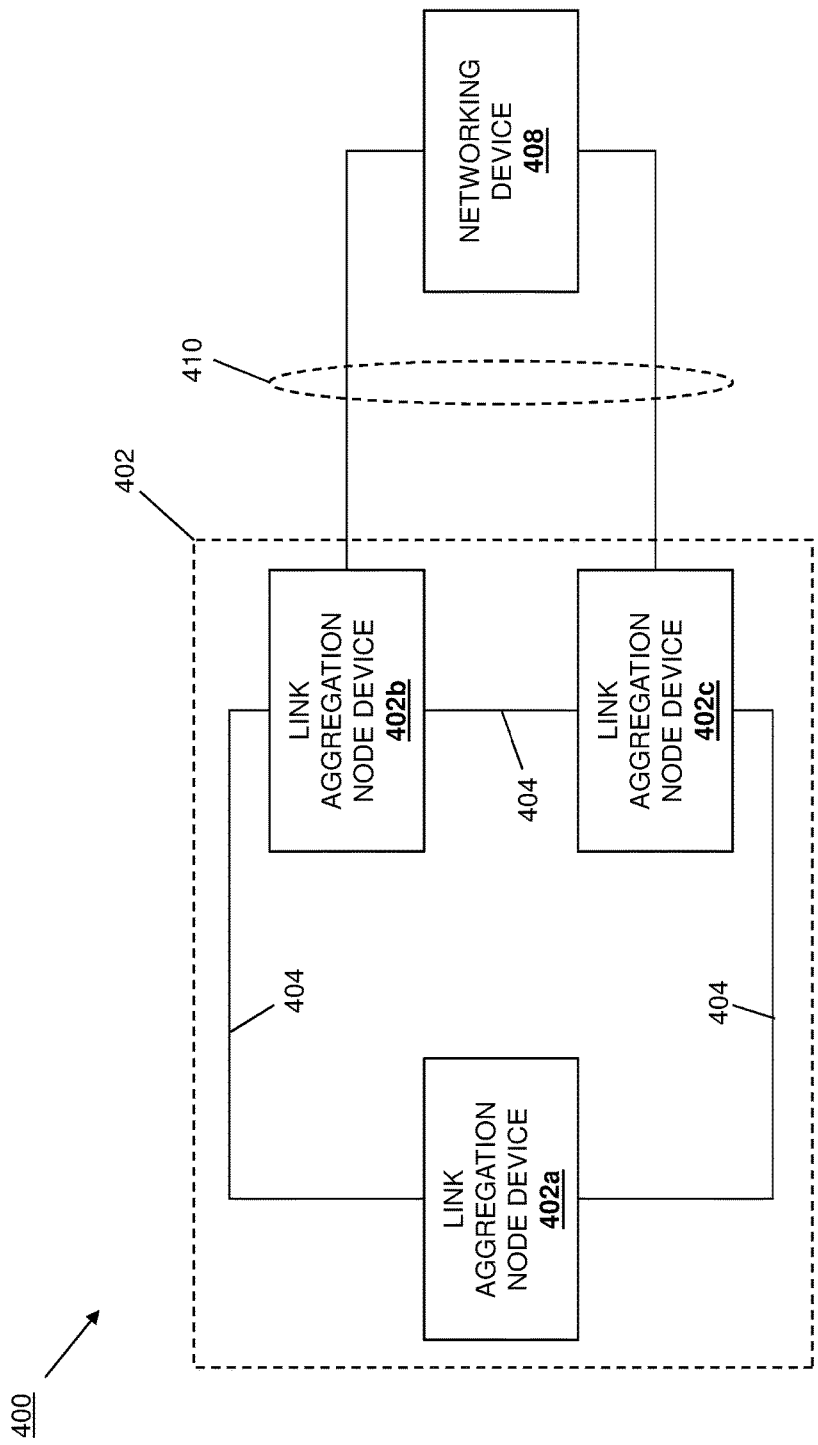
FIG. 4A is a schematic view of an embodiment of an n-node link aggregation system.
Figure 4B:
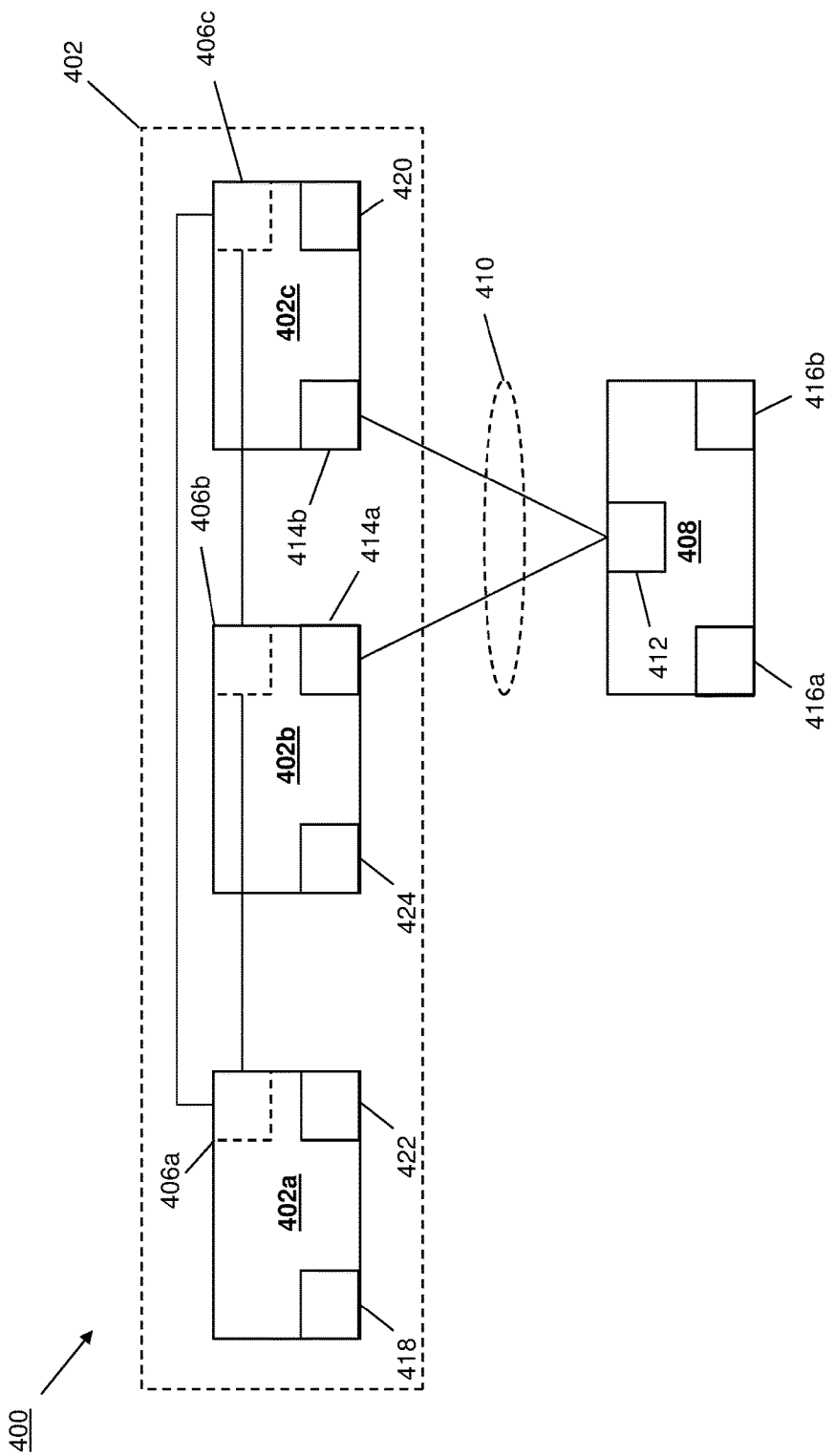
FIG. 4B is a schematic view of the n-node link aggregation system of FIG. 4A that identifies ports on the devices.

Referring now to FIGS. 4A and 4B, an embodiment of a spanning tree enabled n-node link aggregation system 400 is illustrated. In many of the embodiments discussed below, the spanning tree enabled n-node link aggregation system 400 utilizes Virtual Link Trunking (VLT), a proprietary link aggregation protocol available in devices provided by Dell, Inc. of Round Rock, Tex., United States, as the link aggregation protocol discussed below. However, one of skill in the art in possession of the present disclosure will recognize that other link aggregated systems using other link aggregation protocols may be enabled with the spanning tree protocol using the teachings of the present disclosure and thus will fall within its scope. In an embodiment, the spanning tree enabled n-node link aggregation system 400 includes a link aggregation fabric 402 (e.g., a VLT fabric) having a plurality of link aggregation node devices 402a, 402b, and 402c that are connected together by Inter-Chassis Links (ICLs) 404 that each include one or more links between ports on the link aggregation node devices 402a-c.

Figure 2:
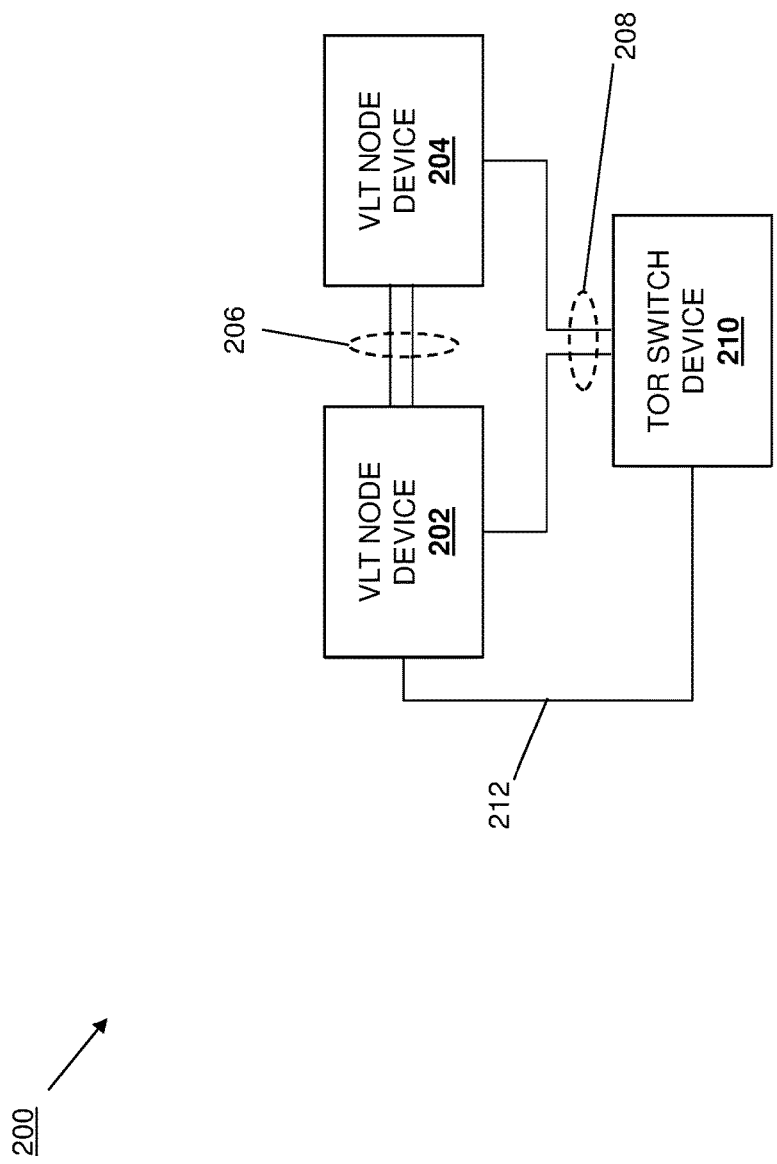
FIG. 2 is a schematic view of an embodiment of a two-node VLT system.
Figure 3:
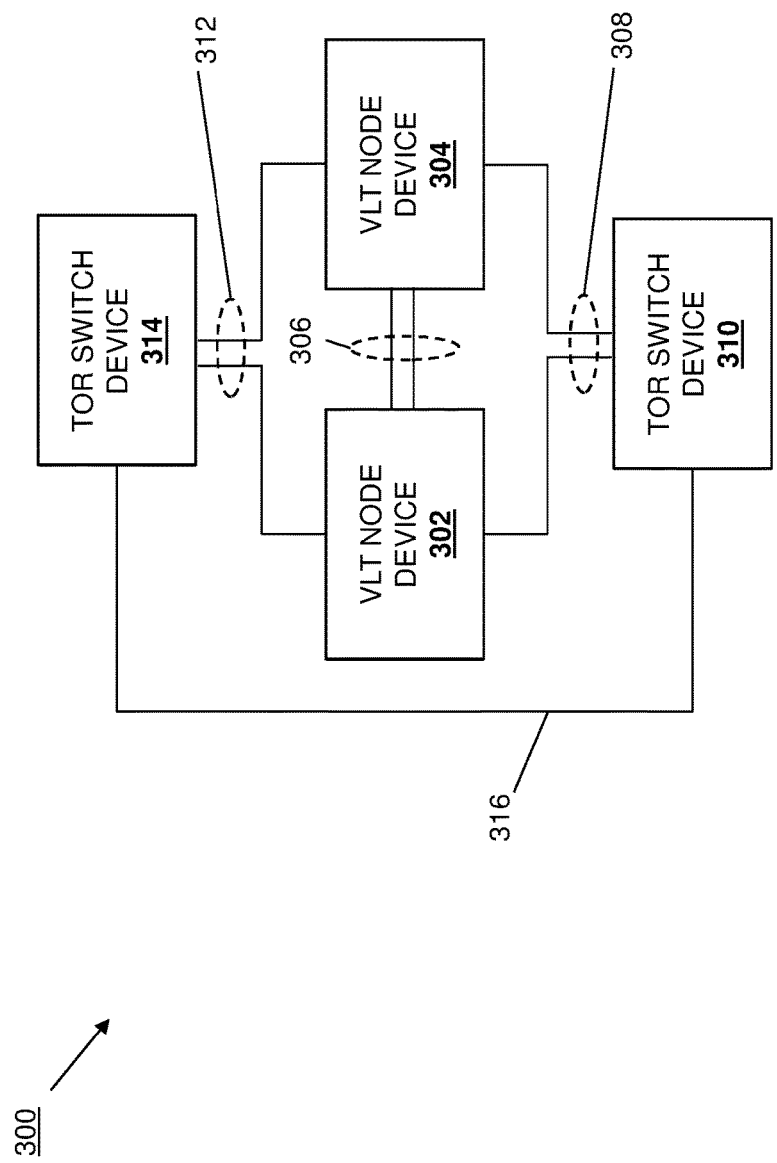
FIG. 3 is a schematic view of an embodiment of a two-node VLT system.

In an embodiment, each of the link aggregation node devices 402a-d may be provided by the IHS 100 of FIG. 1 and/or may include some or all of the components of the IHS 100. In a specific embodiment, the link aggregation node devices 402a-d may be switches, although providing other types of computing devices as the link aggregation node devices 402a-d may fall within the scope of the present disclosure as well. In some embodiments, the link aggregation node devices 404a-d are VLT nodes similar to the VLT node devices 202, 204 of FIG. 2 and the VLT node devices 302, 304 of FIG. 3, with the ICLs 404 similar to the ICL 206 of FIG. 2 and the ICL 306 of FIG. 3. However, one of skill in the art in possession of the present disclosure will recognize that other link aggregated systems utilizing other types of link aggregated node devices connected by other links may be enabled with the spanning tree protocol using the teachings of the present disclosure and thus will fall within its scope.

While FIG. 4A illustrates a particular link aggregation fabric, one of skill in the art in possession of the present disclosure will recognize that link aggregation fabrics may be provided in star configuration, ring configurations, mesh configurations, and/or a variety of other configurations known in the art. Furthermore, while only three link aggregation node devices are illustrated in FIGS. 4A and 4B, one of skill in the art in possession of the present disclosure will recognize that any number of link aggregation node devices (i.e., "N nodes") may be provided in a link aggregation fabric while remaining within the scope of the present disclosure. As discussed in further detail below, the present disclosure introduces the concept of "virtual ports", and a spanning tree protocol engine operating on any of the link aggregation node devices 402a-c will see other link aggregation node devices as directly connected to its virtual port that connects to all of the other link aggregation node devices in the link aggregation fabric 402. As such, FIG. 4B illustrates the link aggregation node device including a virtual port 406a that is connected to a virtual port 406b on the link aggregation node device 402b from the point of view of the spanning tree protocol engine running on that link aggregation node device 402b, and connected to a virtual port 406c on the link aggregation node device 402c from the point of view of the spanning tree protocol engine running on that link aggregation node device 402b. However, while not discussed in detail below, one of skill in the art in possession of the present disclosure will recognize that, from the point of point of view of a spanning tree protocol engine running on the link aggregation node device 402b, the virtual port 406b is connected to the virtual port 406a on the link aggregation node device 402a, and connected to the virtual port 406c on the link aggregation node device 402c. Similarly, from the point of point of view of a spanning tree protocol engine running on the link aggregation node device 402c, the virtual port 406c is connected to the virtual port 406a on the link aggregation node device 402a, and connected to the virtual port 406b on the link aggregation node device 402b.

In an embodiment, the spanning tree enabled n-node link aggregation system 400 includes a networking device 408 that that is coupled to the link aggregation node devices 402b and 402c by a plurality of links that have been provided in a Link Aggregation Group (LAG) 410. In an embodiment, the networking device 408 may be provided by the IHS 100 of FIG. 1 and/or may include some or all of the components of the IHS 100. In a specific embodiment, the networking device 408 may be a switch, although providing other types of computing devices (e.g., server devices) as the networking device 408 may fall within the scope of the present disclosure as well. In some embodiments, the networking device 408 may be a TOR switch device similar to the TOR switch device of FIG. 2 and the TOR switch devices 310 and 314 of FIG. 3, with the LAG 410 similar to the LAG 208 of FIG. 2 and the LAGs 308 and 312 of FIG. 3. However, one of skill in the art in possession of the present disclosure will recognize that other link aggregated systems utilizing other networking devices connected to link aggregation node devices by LAGs may be enabled with the spanning tree protocol using the teachings of the present disclosure and thus will fall within its scope.

FIG. 4B illustrates LAG port(s) 412 on the networking device 408 that are connected via the LAG 410 to LAG ports 414a and 414b on the link aggregation node devices 402b and 402c, respectively. Furthermore, FIG. 4B illustrates non-LAG ports 416a and 416b (also known as "orphan ports") on the networking device 408 which, as discussed below, may be connected to non-LAG ports 418 and 420 (also known as "orphan ports") on the link aggregation node devices 402a and 402b, respectively. Finally, FIG. 4B illustrates backup ports 422 and 424 on the link aggregation node devices 402a and 402b, respectively, that may be coupled together to provide a backup link. While several ports on each of the link aggregation node devices 402a-c and the networking device 408 are illustrated and described, one of skill in the art in possession of the present disclosure will recognize that each of those devices may (and typically will) include many more ports that may be coupled to other devices while remaining within the scope of the present disclosure. Furthermore, while a simplified n-node link aggregation system is illustrated and described for clarity of discussion below, one of skill in the art will recognize that n-node link aggregation systems may (and typically will) include many more link aggregation node devices, networking devices, and other devices in other configurations while remaining within the scope of the present disclosure.

Figure 5:
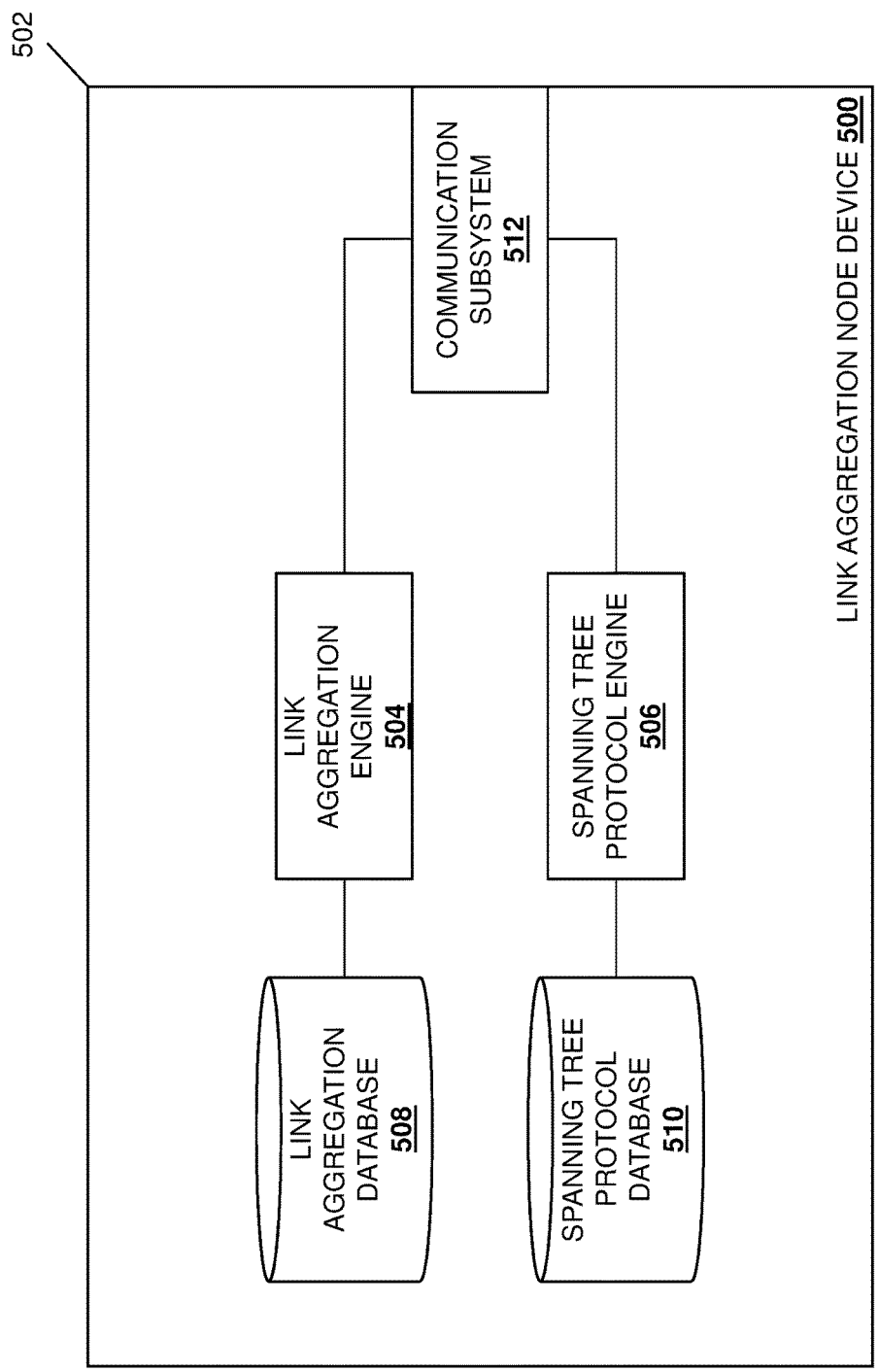
FIG. 5 is a schematic view illustrating an embodiment of a link aggregation node device used in the n-node link aggregation system of FIGS. 4A and 4B.

Referring now to FIG. 5, an embodiment of a link aggregation node device 500 is illustrated that may be any of the link aggregation node devices 402a-c discussed above with reference to FIGS. 4A and 4B. As such, the link aggregation node device 500 may be provided by the IHS 100 of FIG. 1 and/or may include some or all of the components of the IHS 100, and in specific embodiments may be a VLT node such as a switch. In the illustrated embodiment, the link aggregation node device 500 includes a chassis 502 that houses the components of the link aggregation node device 500, only some of which are illustrated in FIG. 5. For example, the chassis 502 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a link aggregation engine 504 and a spanning tree protocol engine 506 that are configured to perform the functions of the link aggregation engines, spanning tree protocol engines, and link aggregation node devices discussed below. In some embodiments, the link aggregation engine 504 may be a VLT engine that is configured to perform VLT operations. However, one of skill in the art in possession of the present disclosure will recognize that other link aggregation engines that perform other link aggregation protocols may fall within the scope of the present disclosure as well.

The chassis 502 may also house a storage system (not illustrated, but which may include the storage device 108 discussed above with reference to FIG. 1) that is coupled to the link aggregation engine 504 and the spanning tree protocol engine 506 (e.g., via a coupling between the storage system and the processing system) and that includes a link aggregation database 508 and a spanning tree protocol database 510 that store data for performing the functionality discussed below. The chassis 502 may also house a communication subsystem 512 that is coupled to the link aggregation engine 504 and the spanning tree protocol engine 506 (e.g., via a coupling between the communication subsystem and the processing system) and that may include a Network Interface Controller (NIC), a wireless communication device (e.g., a BLUETOOTH® communication device, a Near Field Communication (NFC) device, and/or other wireless communications devices known in the art), and/or other communication components known in the art. As such, the communication subsystem may include the ports utilized to provide the ICLs, virtual ports, LAG ports, non-LAG ports, backup ports, and/or other communication connections discussed above with reference to FIG. 4. While a specific embodiment of a link aggregation node device 500 is illustrated and described, one of skill in the art in possession of the present disclosure will recognize that other components may be included in the link aggregation node device 500 to provide conventional link aggregation node device functionality (e.g., switching functionality), as well as the functionality discussed below, while remaining within the scope of the present disclosure.

With reference to FIGS. 4A, 4B, and 5, in the embodiment of the method 600 described below, the spanning tree protocol engine 506 is provided on each of the plurality of link aggregation nodes 402a-c and includes enhancements that enable the use of the conventional spanning tree protocol in the spanning tree enabled n-node link aggregation system 400 without introducing the problems discussed above. However, this embodiment is described in an attempt to provide a clear understanding of the teachings of the present disclosure, and one of skill in the art in possession of the present disclosure will recognize that the functionality of the spanning tree protocol engine 506 may be separated into a conventional spanning tree protocol engine that performs conventional spanning tree protocol functionality, and an enhanced spanning tree protocol engine that performs the enhanced functionality described below, while remaining within the scope of the present disclosure. Furthermore, one of skill in the art in possession of the present disclosure will recognize that some or all of the functionality of the link aggregation engine 504 and the spanning tree protocol engine 506 may be provided on other devices in the spanning tree enabled n-node link aggregation system 400. For example, the link aggregation engine 504 and/or the spanning tree protocol engine 506 may be provided on the networking 408 of FIGS. 4A and 4B while remaining within the scope of the present disclosure.

The systems of the present disclosure, discussed above, may be utilized in a variety of manners to perform methods for enabling the spanning tree protocol in an n-node link aggregation system such as, for example, an n-node VLT system. As such, different methods that illustrate and describe the functionality required to do so are discussed below. In any or all of those methods, the systems of the present disclosure may utilize the concept of the "virtual fabric port", referred to herein generally as a "virtual port" (e.g., the virtual ports 406a, 406b, and 406c discussed above). As illustrated and described above with reference to FIG. 4A, while the link aggregation node devices 402a, 402b, and 402c may be connected by several physical ports and links, the virtual port concept allows spanning tree protocol engines running on each of the link aggregation nodes 402a-c to "see" the others of the link aggregation nodes as if they are directly connected to its virtual port (e.g., the spanning tree protocol engine running on the link aggregation node device 402a sees each of the link aggregation node device 402b and 402c as directly connected to its virtual port 406a.) As such, each of the link aggregation nodes in the spanning tree enabled n-node link aggregation system 400 includes a virtual port that connects to respective virtual ports on all of the other link aggregation node devices in the spanning tree enabled n-node link aggregation system 400.

Links to the virtual ports in the spanning tree enabled n-node link aggregation system of the present disclosure are not treated by the spanning tree protocol engines as shared links. For example, as would be understood by one of skill in the art in possession of the present disclosure, the conventional spanning tree protocol sends proposals on point-to-point links between devices, and opens up links when agreements are received, which generally provides for quick convergence of the spanning tree (e.g., under one second.) However, on shared links, the spanning tree protocol will run a timer after sending a proposal, and if no complaints or other feedback is received back within the time period monitored by the timer the port will be designated to forward data, which can take a relatively long time (e.g., twenty to thirty seconds.) As such, not treating links to virtual ports as shared links prevents such relatively long spanning tree convergence times.

In embodiments of any of the methods discussed below, the spanning tree enabled n-node link aggregation system of the present disclosure may also include a link aggregation fabric manager (e.g., a VLT fabric manager) that is provided in the link aggregation node devices 402a-c and that operates according to link aggregation protocols (e.g., VLT protocols) to prevent data loops in the link aggregation fabric (e.g., a VLT fabric), while assuring communication paths between any two link aggregation node devices. As such, the spanning tree protocol engine running on the link aggregation node devices 402a-c may operate with the assumption that there is no loop in the link aggregation fabric 402 (as such loops are prevented by the link aggregation fabric manager.) Furthermore, the spanning tree protocol engine running on the link aggregation node devices 402a-c may not operate on ICLs between link aggregation node devices, and may not calculate spanning tree protocol states for ports connected to those ICLs. As such, the ports connected to ICLs may always be in a forwarding state and not blocked. Further still, the spanning tree protocol engine running on the link aggregation node devices 402*a-c* may operate on the virtual ports provided on the link aggregation node devices, with the port path cost of those virtual ports being some minimal value (e.g., around one). As such, virtual ports may not be designated alternate/backup ports (i.e., to prevent them from being blocked, as they provide a link to the link aggregation fabric 402.) Finally, only one non-virtual port per link aggregation domain (e.g., VLT domain) may be designated as a root port.

As is described further below, the spanning tree enabled n-node link aggregation system of the present disclosure may include some modified operations when transmitting control messages (e.g., Bridge Protocol Data Units (BP-DUs)). For example, when transmitting and receiving spanning tree protocol control messages on virtual ports, the link aggregation fabric manager may create a group (e.g., a Control Plane Services (CPS) group) for link aggregation node devices in the link aggregation domain. When control messages are transmitted, the spanning tree protocol engine may then provide those control messages in an object (e.g., a CPS object) and publish that object in the group for the link aggregation node devices in the link aggregation domain. As such, each link aggregation node device may receive a single copy of the control message.

In some embodiments, a link aggregation node device in the link aggregation fabric may be designated a primary link aggregation node device (e.g., a primary VLT node) or a secondary link aggregation node device (e.g., a secondary VLT node). In such embodiments, the spanning tree protocol engine that operates on the primary link aggregation node device may control the role/state for members of a LAG (i.e., "VLT LAG members") to control, for example, whether VLT LAG members that provide the VLT LAG perform forwarding operations, blocking operations, and/or other port roles/states known in the art, and may propagate those port roles/states to the secondary link aggregation node device connected to the VLT LAG. As such, the port role/state for VLT LAG members included in a VLT LAG will remain consistent across all of the VLT LAG members on the link aggregation node devices that are connected to that VLT LAG. Furthermore, the spanning tree protocol engine operating on the link aggregation node devices may operate to ensure that each of the VLT LAGs is visible to the spanning tree protocol engine operating in the spanning tree enabled n-node link aggregation system such that each spanning tree protocol engine is aware of those VLT LAGs, which will allow a primary link aggregation node device to control the port role/state for that VLT LAG. As such, even VLT LAGs that have no links (and even no local port-channel) connected a link aggregation node device will be visible to that link aggregation node device. When control messages are received on a VLT LAG, they may be provided in an object and published to the group for the link aggregation node devices in the link aggregation domain similarly as discussed above, which allows the primary link aggregation node device to receive the control message (i.e., from the secondary link aggregation node device) even if the primary link aggregation node device does not have a VLT LAG member.

In embodiments of any of the methods discussed below, a link aggregation engine may couple a plurality of ICL ports on link aggregation node devices via ICLs. In an embodiment, a link aggregation fabric manager (e.g., a VLT fabric manager) provided in the link aggregation node devices may operate according to link aggregation protocols (e.g., the VLT protocol) to create a plurality of ICLs between link aggregation node devices in a link aggregation fabric. For example, with reference to FIG. 4A, the link aggregation fabric manager may cause the link aggregation engines 504 provided in the link aggregation node devices 402*a-c* to operate to cause the ICLs 404, discussed above, to be created. The details of the creation of ICLs in link aggregation fabrics (e.g., the creation of ICLs in VLT fabrics according to the VLT protocol) are known in the art and will not be discussed herein in detail. The link aggregation engine 504 may also aggregate at least one LAG port on the link aggregation node devices to provide a LAG. In an embodiment, the link aggregation fabric manager (e.g., the VLT fabric manager) may operate according to link aggregation protocols (e.g., the VLT protocol) to create LAGs between at least one networking device and a plurality of link aggregation node devices. For example, with reference to FIG. 4A, the link aggregation fabric manager may cause the link aggregation engines 504 provided in the link aggregation node devices 402*a-c* and/or the networking device 408 to operate to provide the LAG 410, discussed above, to be created. The details of the creation of LAGs in link aggregation fabrics (e.g., VLT LAGS in VLT fabrics according to the VLT protocol) are known in the art and will not be discussed herein in detail.

Furthermore, while the discussion above details the creation of the ICLs and LAGs in the link aggregation fabric, other features of the link aggregation fabric (e.g., a VLT fabric) may be created prior to or during each of the methods discussed below, and other link aggregation operations may be performed, while remaining within the scope of the present disclosure. For example, the link aggregation fabric manager (e.g., a VLT fabric manager) may perform an ICL loop prevention algorithm to generate a variety of forwarding rules that are configured to break loops in the link aggregation fabric (e.g., a VLT fabric), and provide those forwarding rules to the link aggregation node devices 402*a-c*. However, as discussed above, if the conventional spanning tree protocol were to then be provided on that link aggregation fabric, it would operate to block redundant ICLs, even if there is no loop in the link aggregation fabric (i.e., when a redundant ICL Is part of a data loop that extends outside of the link aggregation fabric). As such, in order to provide the spanning tree protocol in the link aggregation fabric, enhancements to the spanning tree protocol are performed during the methods in order to prevent those and the other issues discussed above from occurring.

Before or during the methods below, the spanning tree protocol engines in the link aggregation node devices may be used to designate a first link aggregation node as a root bridge. In some embodiments, prior to the methods, the spanning tree protocol may be provided on each of the link aggregation node devices in the link aggregation fabric, as well as devices coupled to the link aggregation fabric. In a specific example, a single instance of the spanning tree protocol may be provided on the link aggregation node devices in the link aggregation fabric, as well as some or all of the networking devices coupled to the link aggregation fabric, according to the Institute of Electrical and Electronics Engineers (IEEE) 802.1q specification that defines a common spanning tree that provides one spanning tree instance for the entire fabric. However, in other examples, more than one instance of the spanning tree protocol may be provided on the link aggregation node devices in the link aggregation fabric. In a specific example, with reference to FIG. 4A, during or prior to the methods the spanning tree protocol may be provided on any or all of the link aggregation node devices 402*a-c* and the networking device 408. As such, the spanning tree protocol may operate to designate a device in the spanning tree enabled n-node link aggregation system 400 as a root bridge. In an embodiment, the designation of a device as the root bridge may be in response to that device being the highest priority device in the spanning tree enabled n-node link aggregation system.

For example, as would be understood by one of skill in the art in possession of the present disclosure, a user or network administrator may configure devices in the spanning tree enabled n-node link aggregation system with "best" bridge priorities, and following the exchange of control messages (e.g., Bridging Protocol Data Units (BDPUs)) between the devices, the device with the highest priority (i.e., the "best" bridge in the topology) will be designated as the root bridge. However, the specific details of the designation of a root bridge according to the spanning tree protocol are known in the art and will not be discussed herein in detail. As such, before or during the methods, the user or network administrator will designate one of the devices in the spanning tree enabled n-node link aggregation system as the node device with the highest priority, which will cause the spanning tree protocol to designate that device as the root bridge. In the examples below, different particular devices in the spanning tree enabled n-node link aggregation system are designated as the root bridge by the spanning tree protocol, but one of skill in the art will recognize that any of the devices in the spanning tree enabled n-node link aggregation system may be designated as the root bridge (i.e., based on the prioritization of that link aggregation node device by the user/network administrator) while remaining within the scope of the present disclosure.

Thus, a variety of the functionality discussed above, as well as other functionality discussed below, may be performed to enable the use of the spanning tree protocol in an n-node link aggregation system, and one of skill in the art in possession of the present disclosure will recognize how the functionality described above may be utilized in the specific methods described below. However, while several specific methods corresponding to particular use cases are illustrated and described herein to provide examples of the functionality utilized to enable the spanning tree protocol in an n-node link aggregation system, one of skill in the art in possession of the present disclosure will also realize that other, different use cases may employ this functionality in a similar manner, and a wide variety of modification to the methods and functionality discussed below is envisioned as falling within the scope of the present disclosure.

Figure 6:
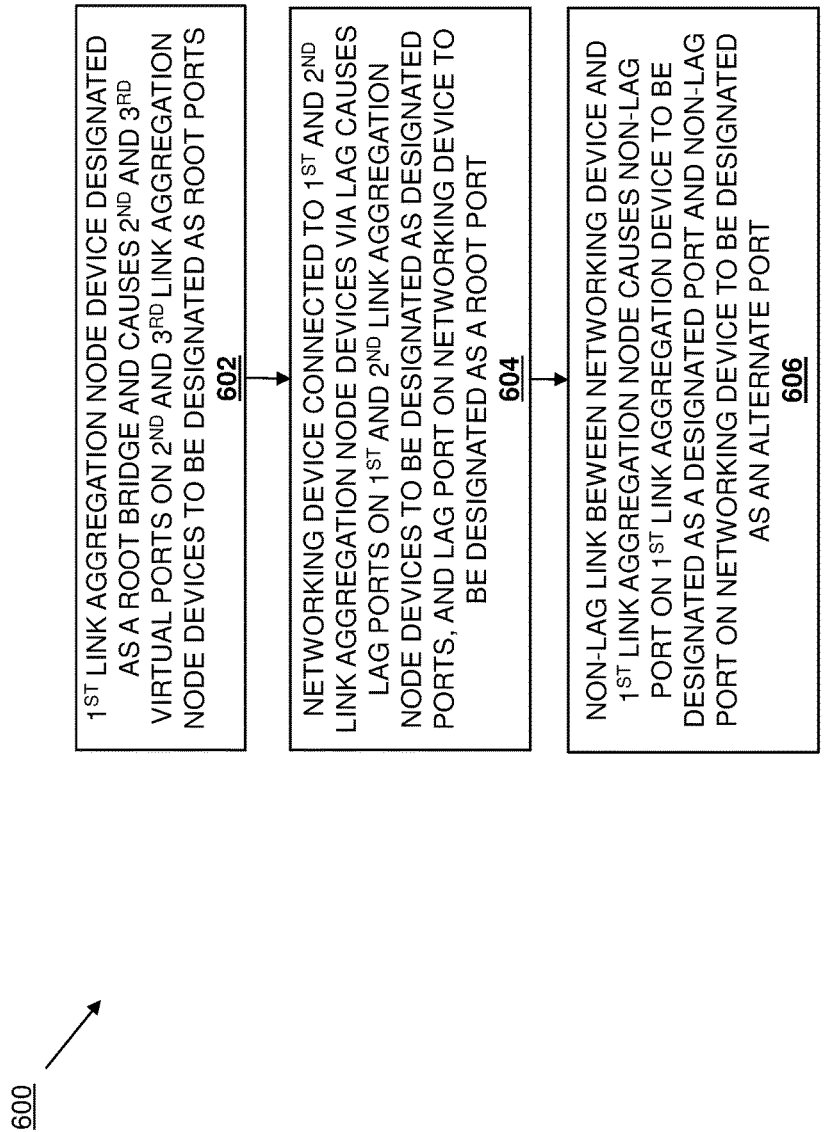
FIG. 6 is a flow chart illustrating an embodiment of a method for enabling the spanning tree protocol in an n-node link aggregation system.

Referring now to FIG. 6, a specific embodiment of a method 600 for enabling the spanning tree protocol in an n-node link aggregation system is illustrated. The system and method 600 are described below to provide an example of the use of the teachings of the present disclosure to provide a spanning tree protocol topology convergence when a link aggregation node device is provided as a root bridge. As such, when the VLT protocol is used as the link aggregation protocol, the method 600 provides for spanning tree protocol convergence when a VLT node is provided as the root bridge (discussed above.) In this example, the link aggregation node device 402*a* is designated as the primary link aggregation node device, while the link aggregation node devices 402*b* and 402*c* are designated as secondary link aggregation node devices. However, other nodes in the network (e.g., non-VLT nodes) may be designated as a root bridge as well.

Figure 7A:
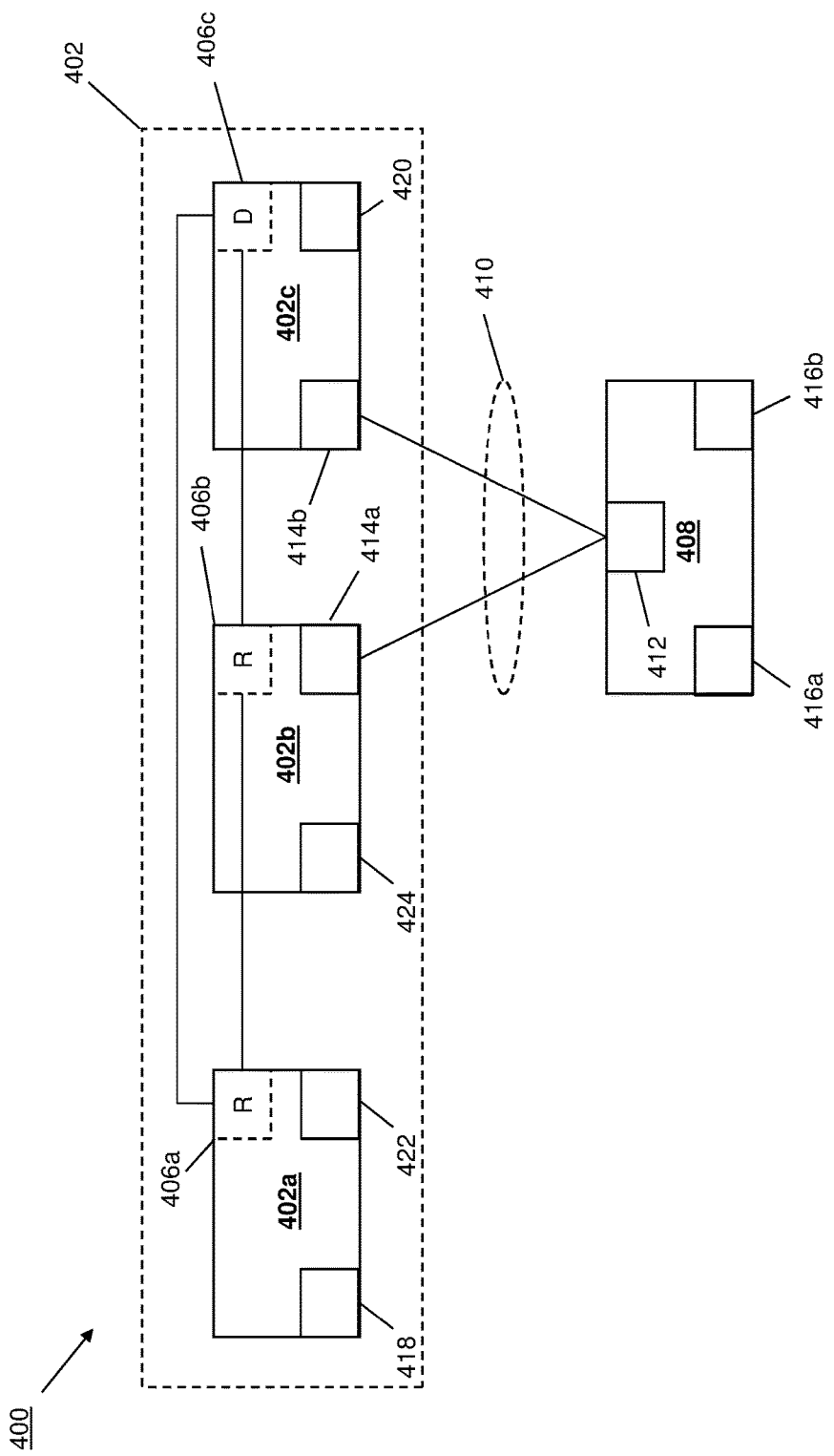
FIG. 7A is a schematic view illustrating an embodiment of the n-node link aggregation system of FIG. 4B during the method of FIG. 6.

Referring now to FIG. 7A, the method 600 begins at block 602 where a first link aggregation node device is designated as a root bridge and causes second and third virtual ports on second and third link aggregation node devices to be designed as root ports. In an embodiment, at block 602, the spanning tree protocol engine 506 running on the device(s) in the spanning tree enabled n-node link aggregation system 400 may designate the link aggregation node device 402*c* as a root bridge (e.g., because the link aggregation node device 402*c* is the highest priority device in the spanning tree enabled n-node link aggregation system 400 as discussed above). In response to the link aggregation node device 402*c* being designated as the root bridge, the spanning tree protocol engine 506 running on the device(s) in the spanning tree enabled n-node link aggregation system 400 will operate to designate the virtual port 406*c* in the link aggregation node device 402*c* as a designated port (indicated by the "D" in the virtual port 406*c* illustrated in FIG. 7A), while designating the virtual port 406*a* in the link aggregation node device 402*a* and the virtual port 406*b* in the link aggregation node device 402*b* as root ports (indicated by the "R" in the virtual ports 406*a* and 406*b* illustrated in FIG. 7A). For example, the link aggregation node device 402*a* operating as the primary link aggregation node device and the root bridge may send control messages (e.g., BPDUs) over the links between the virtual ports 406*a* and each of the virtual ports 406*b* and 406*c* to cause the designation of the designated ports and the root ports as discussed above (e.g., each of the virtual ports 406*a*, 406*b*, and 406*c* will send BPDUs until the designated port and root port designations are made, after which virtual ports 406*b* and 460*c* (designated as root ports) will stop sending BPDUs and virtual port 406*c* (designated as a designated port) will continue sending BPDUs.)

Referring now to FIG. 7B, the method 600 then proceeds to block 604 where a networking device connected to the first and second link aggregation node devices via a LAG causes LAG ports on the first and second link aggregation node devices to be designated as designated ports, and a LAG port on the networking device to be designated as a root port. For the purposes of this example, the networking device 408 is a lower priority device than the link aggregation node device 402*c* (which is the highest priority device in the system, hence its designation as the root bridge.) In an embodiment, at block 604, the link aggregation engine 504 may operate to provide the LAG 410 between the networking device 408 and the link aggregation node devices 402*b* and 402*c* as discussed above. For purposes of the discussions below, the LAG 410 may have a path cost of fifty. In response to the LAG 410 being provided between the networking device 408 and the link aggregation node devices 402*b* and 402*c*, the spanning tree protocol engine 506 running on the device(s) in the spanning tree enabled n-node link aggregation system 400 will operate to designate the LAG port 412 on the networking device 408 as a root port (indicated by the "R" in the LAG port 412 illustrated in FIG. 7B), while designating the LAG port 414*a* in the link aggregation node device 402*b* and the LAG port 414*b* in the link aggregation node device 402*c* as designated ports (indicated by the "D" in the LAG ports 414*a* and 414*b* illustrated in FIG. 7B.)

Figure 7C:
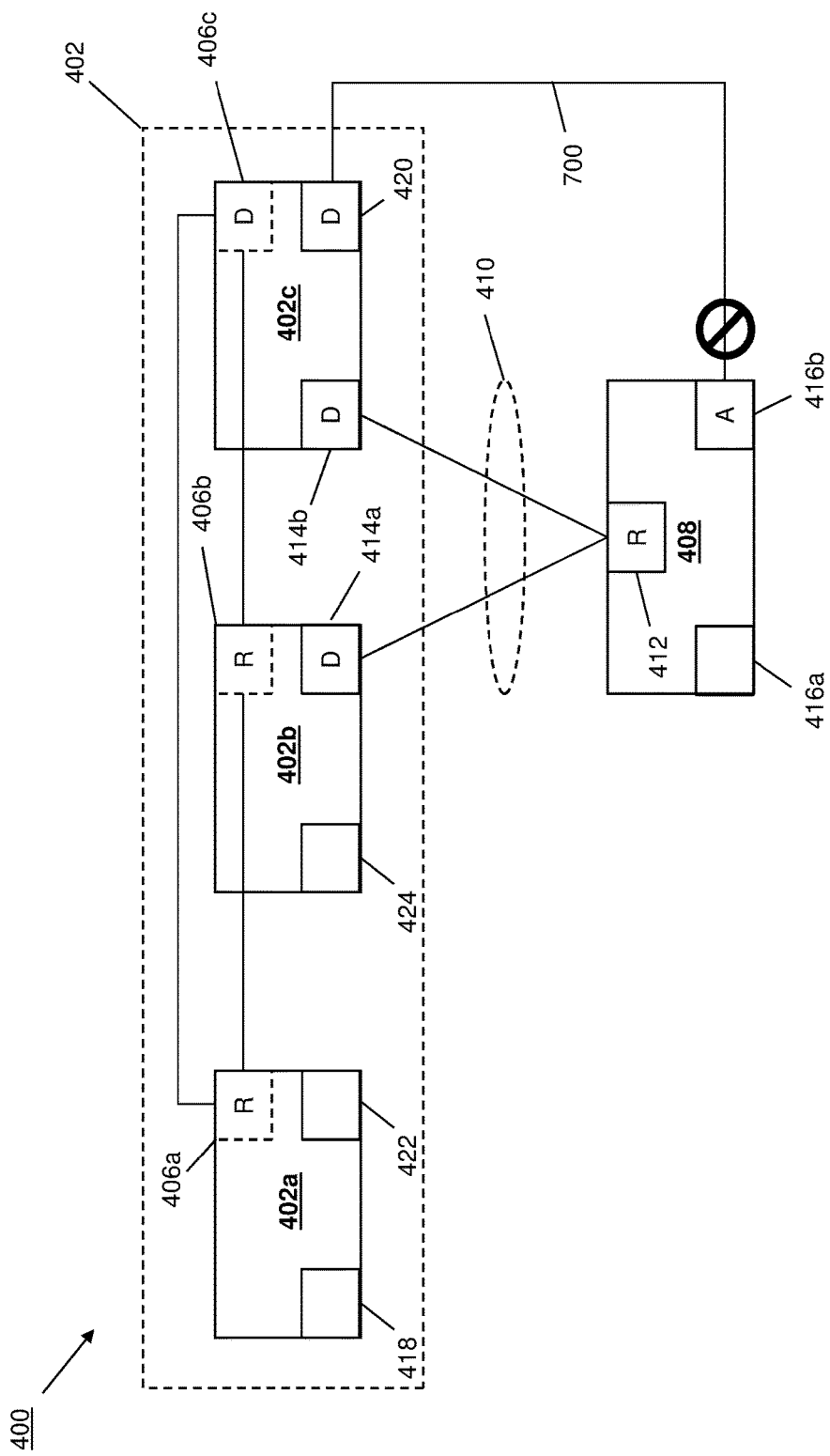
FIG. 7C is a schematic view illustrating an embodiment of the n-node link aggregation system of FIG. 4B during the method of FIG. 6

Referring now to FIG. 7C, the method 600 then proceeds to block 606 where a non-LAG link between the networking device and the first link aggregation node device causes a non-LAG port on the first link aggregation node device to be designated as a designated port and a non-LAG port on the networking device to be designated as an alternate port. In an embodiment, at block 606, a non-LAG link 700 may be provided between the non-LAG port 416*b* on the networking device 408 and the non-LAG port 420 on the link aggregation node device 402*c*, as illustrated in FIG. 7C. For the purposes of this example, the non-LAG link 700 may have a path cost of one hundred, which is greater than the path cost of the LAG 410, discussed above. In response to the non-LAG link 700 being provided between the non-LAG port 416b on the networking device 408 and the non-LAG port 420 on the link aggregation node device 402c, the spanning tree protocol engine 506 running on the device(s) in the spanning tree enabled n-node link aggregation system 400 will operate to designate the non-LAG port 416b on the networking device 408 as an alternate port (indicated by the "A" in the non-LAG port 416b illustrated in FIG. 7C), while designating the non-LAG port 420 in the link aggregation node device 402c as a designated port (indicated by the "D" in the non-LAG port 420 illustrated in FIG. 7C.) For example, state event machines operating in the link aggregation node device 402c and the networking device 408 may cause the designation of the designated ports and alternate ports discussed above. FIG. 7C illustrates how designation of the non-LAG port 416b in the networking device 408 as an alternate port causes the non-LAG port 416b to be blocked as indicated by the "no"/circle/backslash symbol. Thus, the system and methods of the present disclosure provide a spanning tree protocol topology convergence when a link aggregation node device is provided as a root bridge, while ensuring that loops will be blocked (e.g., via the blocking of the non-LAG port 416b on the networking device 408 via its designation as an alternate port.)

Figure 8:
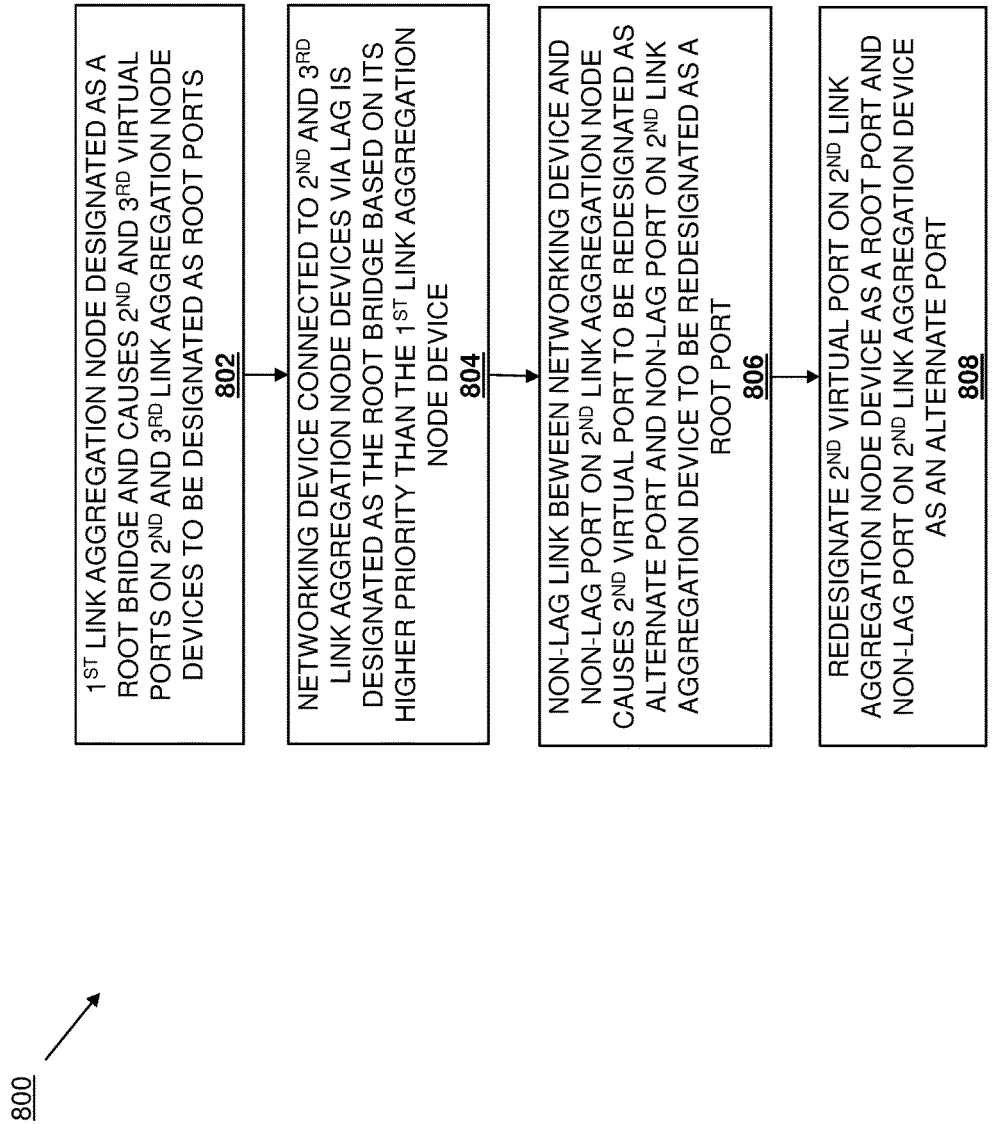
FIG. 8 is a flow chart illustrating an embodiment of a method for enabling the spanning tree protocol in an n-node link aggregation system.

Referring now to FIG. 8, a specific embodiment of a method 800 for enabling the spanning tree protocol in an n-node link aggregation system is illustrated. The system and method 800 are described below to provide an example of the use of the teachings of the present disclosure to provide a spanning tree protocol topology convergence without loops when a networking device outside of the link aggregation fabric is provided as a root bridge and connected to the link aggregation node devices via a LAG and a non-LAG link. In this example, the link aggregation node device 402a is designated as the primary link aggregation node device, while the link aggregation node devices 402b and 402c are designated as secondary link aggregation node devices.

Figure 9A:
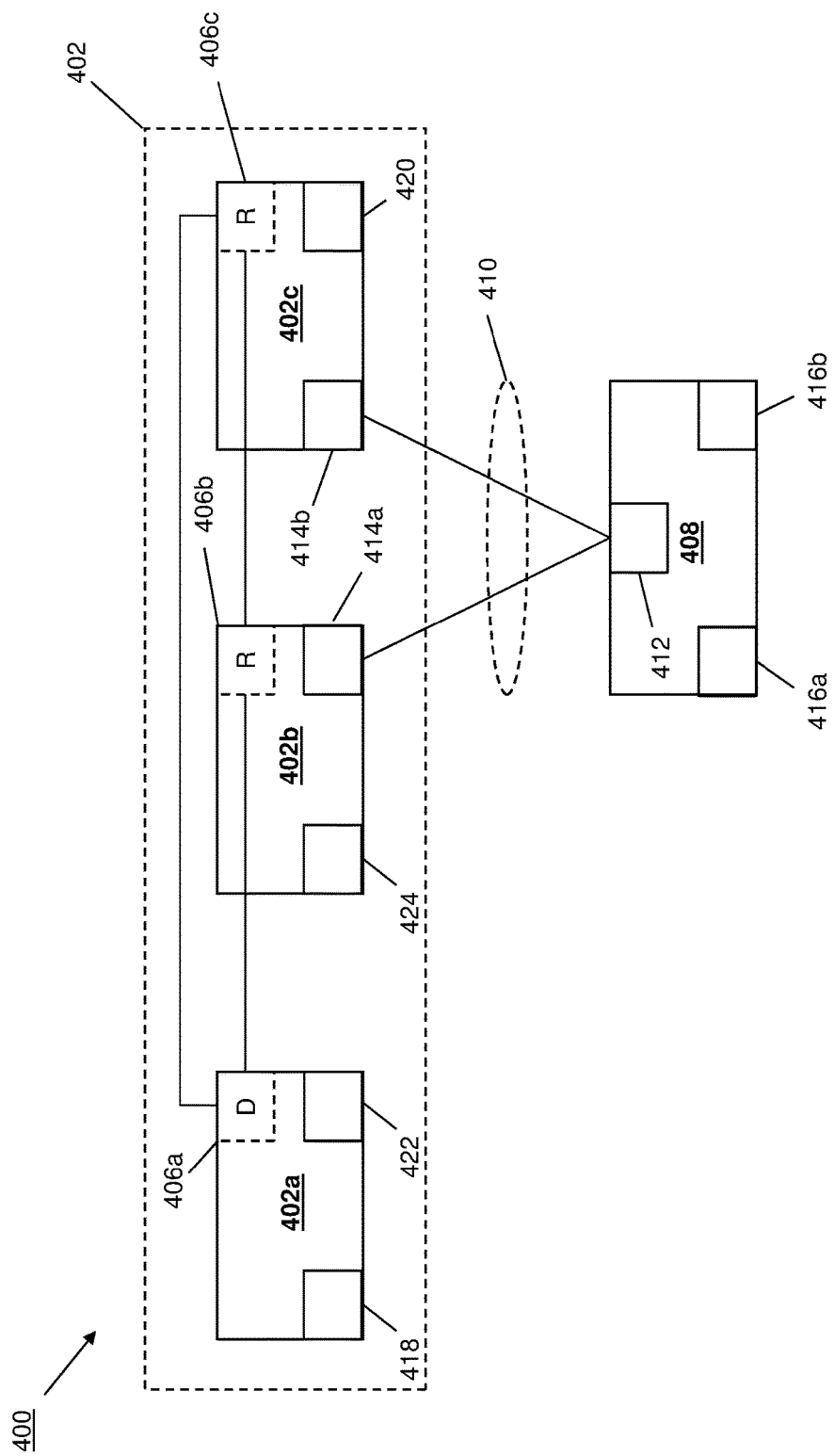
FIG. 9A is a schematic view illustrating an embodiment of the n-node link aggregation system of FIG. 4B during the method of FIG. 8.

Referring now to FIG. 9A, the method 800 begins at block 802 where a first link aggregation node device is designated as a root bridge and causes second and third virtual ports on second and third link aggregation node devices to be designed as root ports. In an embodiment, at block 802, the spanning tree protocol engine 506 running on the device(s) in the spanning tree enabled n-node link aggregation system 400 may designate the link aggregation node device 402a as a root bridge (e.g., because the link aggregation node device 402a is the highest priority link aggregation node device in the link aggregation fabric 400, as discussed above). In response to the link aggregation node device 402a being designated as the root bridge, the spanning tree protocol engine 506 running on the device(s) in the spanning tree enabled n-node link aggregation system 400 will operate to designate the virtual port 406a in the link aggregation node device 402a as a designated port (indicated by the "D" in the virtual port 406c illustrated in FIG. 7A), while designating the virtual port 406b in the link aggregation node device 402b and the virtual port 406c in the link aggregation node device 402c as root ports (indicated by the "R" in the virtual ports 406a and 406b illustrated in FIG. 9A). For example, each of the virtual ports in the link aggregation node devices will exchange BPDUs with information that causes the designation of the designated ports and root ports as discussed above.

Figure 9B:
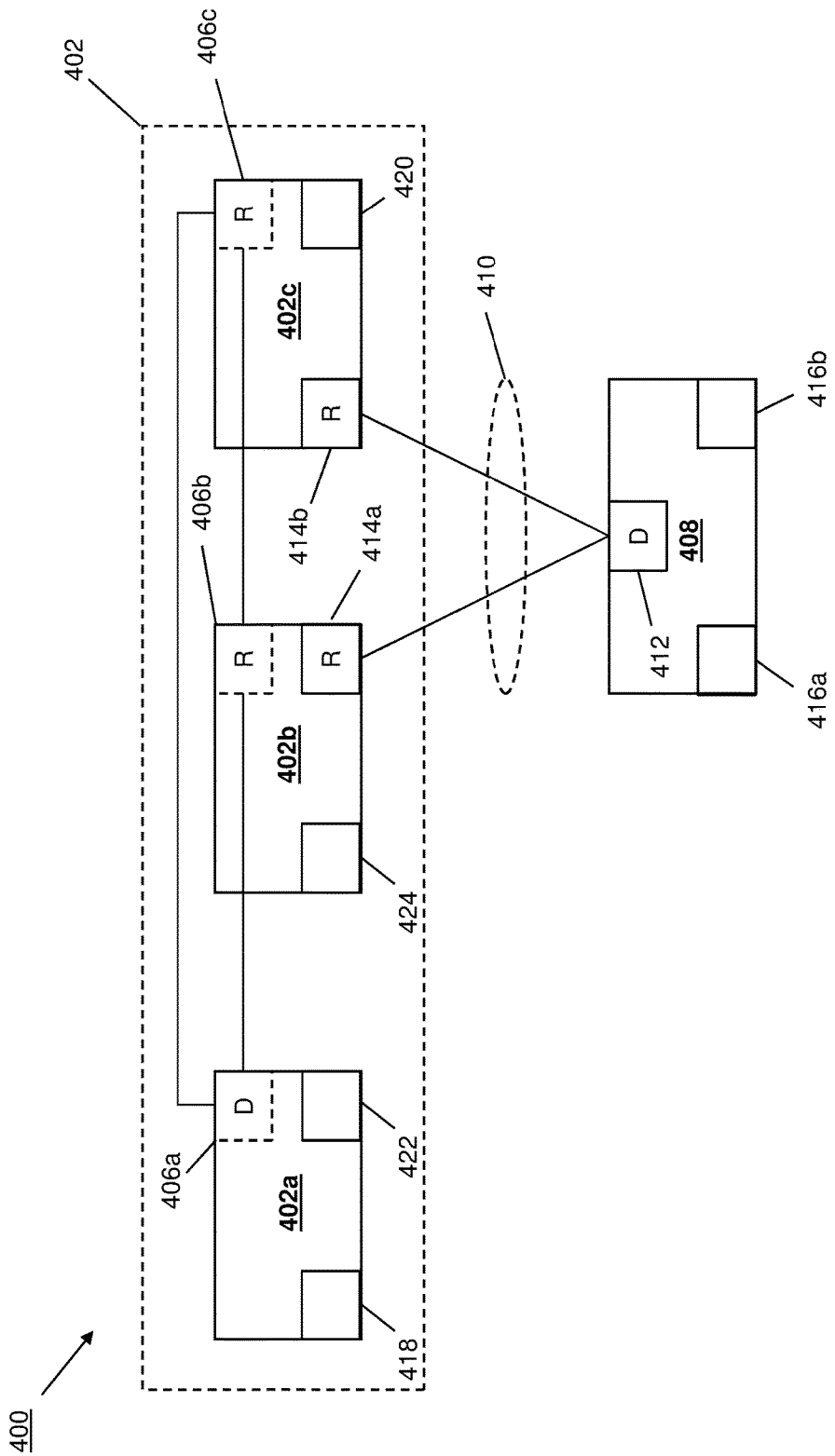
FIG. 9B is a schematic view illustrating an embodiment of the n-node link aggregation system of FIG. 4B during the method of FIG. 8.

Referring now to FIG. 9B, the method 800 then proceeds to block 804 where a networking device connected to the second and third link aggregation node devices via a LAG is designated as the root bridge based on its higher priority than the first link aggregation node device. For the purposes of this example, the networking device 408 is a higher priority device than the link aggregation node device 402a, and thus at block 804 the spanning tree protocol engine 506 running on the device(s) in the spanning tree enabled n-node link aggregation system 400 may designate the networking device 408 as the root bridge (e.g., because the networking device is the highest priority device in the spanning tree enabled n-node link aggregation system 400, as discussed above). In an embodiment, at block 804, the link aggregation engine 504 may operate to provide the LAG 410 between the networking device 408 and the link aggregation node devices 402b and 402c as discussed above. For purposes of the discussions below, the LAG 410 may have a path cost of fifty. In response to the LAG 410 being provided between the networking device 408 and the link aggregation node devices 402b and 402c, the spanning tree protocol engine 506 running on the device(s) in the spanning tree enabled n-node link aggregation system 400 will operate to designate the LAG port 412 on the networking device 408 as a designated port (indicated by the "D" in the LAG port 412 illustrated in FIG. 9B), while designating the LAG port 414a in the link aggregation node device 402b and the LAG port 414b in the link aggregation node device 402c as root ports (indicated by the "R" in the LAG ports 414a and 414b illustrated in FIG. 9B.) For example, the networking device 408 operating as the root bridge may send control messages (e.g., BPDUs) over the LAG 410 and the links between the virtual ports to the link aggregation node device 402a acting as the primary link aggregation node device, and the link aggregation node device 402a acting as the primary link aggregation node device may use those control messages (e.g., compare the information in those BDPUs to information received in BDPUs from other link aggregation node devices), as well as generate control messages and send them over the links between the virtual ports to cause the designation of the designated ports and root ports as discussed above.

Figure 9C:
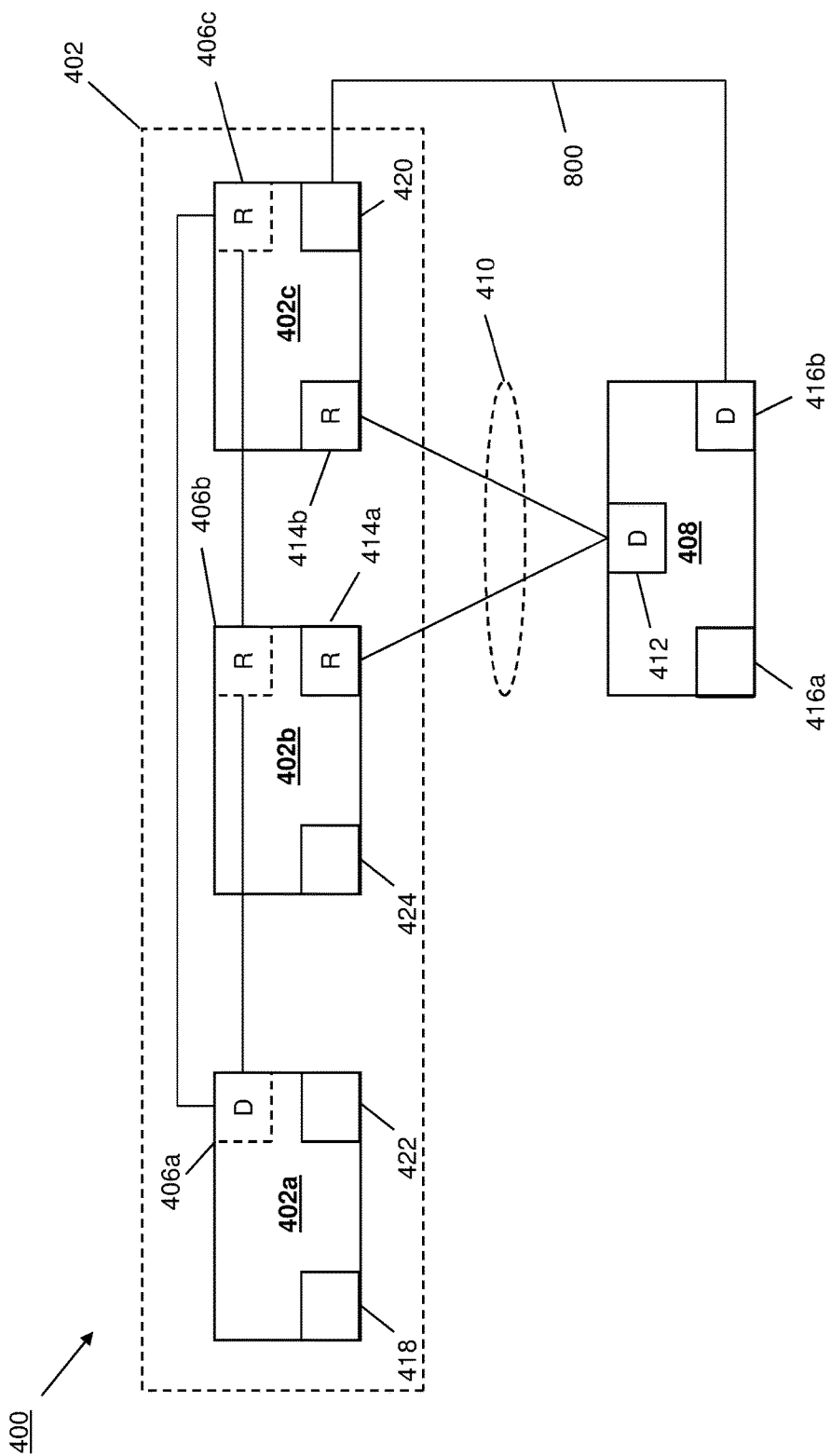
FIG. 9C is a schematic view illustrating an embodiment of the n-node link aggregation system of FIG. 4B during the method of FIG. 8.
Figure 9D:
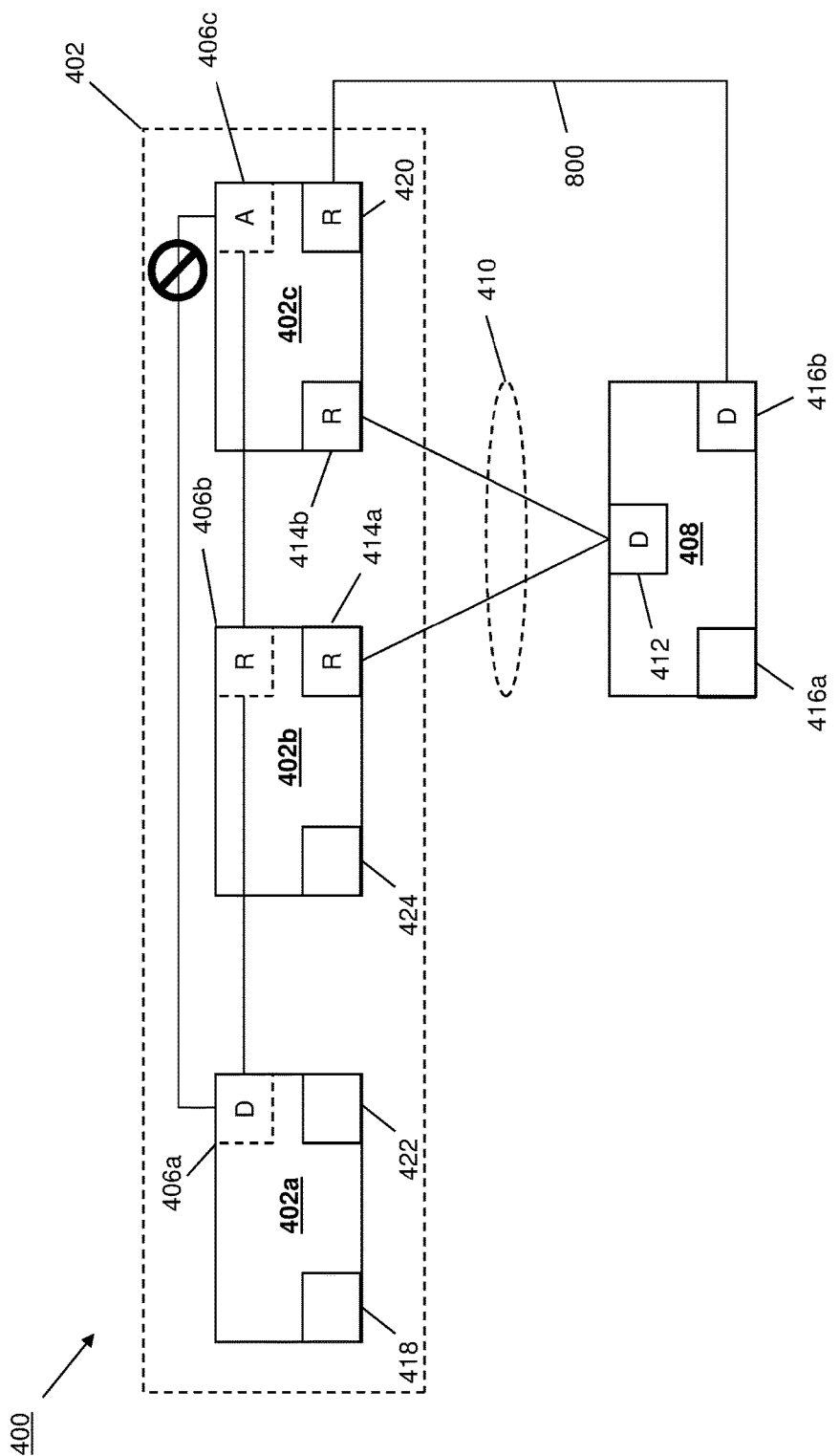
FIG. 9D is a schematic view illustrating an embodiment of the n-node link aggregation system of FIG. 4B during the method of FIG. 8.

Referring now to FIGS. 9C and 9D, the method 800 then proceeds to block 806 where a non-LAG link between the networking device and a non-LAG port on the second link aggregation node device causes the second virtual port on the second link aggregation node device to be redesignated as an alternate port, and a non-LAG port on the second link aggregation node device to be designated as a root port. In an embodiment, at block 806, a non-LAG link 800 may be provided between the non-LAG port 416b on the networking device 408 and the non-LAG port 420 on the link aggregation node device 402, as illustrated in FIG. 9C. For the purposes of this example, the non-LAG link 800 may have a path cost of fifty, which is equal to the port path cost of the LAG 410, discussed above. In response to the non-LAG link 800 being provided between the non-LAG port 416b on the networking device 408 and the non-LAG port 420 on the link aggregation node device 402, the spanning tree protocol engine 506 running on the device(s) in the spanning tree enabled n-node link aggregation system 400 will operate to designate the non-LAG port 416b on the networking device 408 as a designated port (indicated by the "D" in the non-LAG port 416b illustrated in FIG. 9C). For example, a state event machine operating in the networking device 408 may cause the designation of the designated ports discussed above.

Furthermore, in response to the non-LAG link 700 being provided between the non-LAG port 416*b* on the networking device 408 and the non-LAG port 420 on the link aggregation node device 402, the spanning tree protocol engine 506 running on the device(s) in the spanning tree enabled n-node link aggregation system 400 will operate to redesignate the virtual port 406*c* in the link aggregation node device 402*c* from a root port (indicated by the "R" in the virtual port 406*c* illustrated in FIG. 9C) to an alternate port (indicated by the "A" in the virtual port 406*c* illustrated in FIG. 9D), while also designating the non-LAG port 420 in the link aggregation node device 402*c* as a root port (indicated by the "R" in the non-LAG port 420 illustrated in FIG. 9D) One of skill in the art in possession of the present disclosure will recognize that such conventional operation of the spanning tree protocol would block the virtual port 406*c* (i.e., as indicated by the "no"/circle/backslash symbol due to its designation as an alternate port) that provides a link to the link aggregation node device 402*a* in the link aggregation fabric (and hence connectivity to the link aggregation fabric and each of the link aggregation nodes), and that block 808 of the method is performed to prevent such blocking from happening.

Figure 9E:
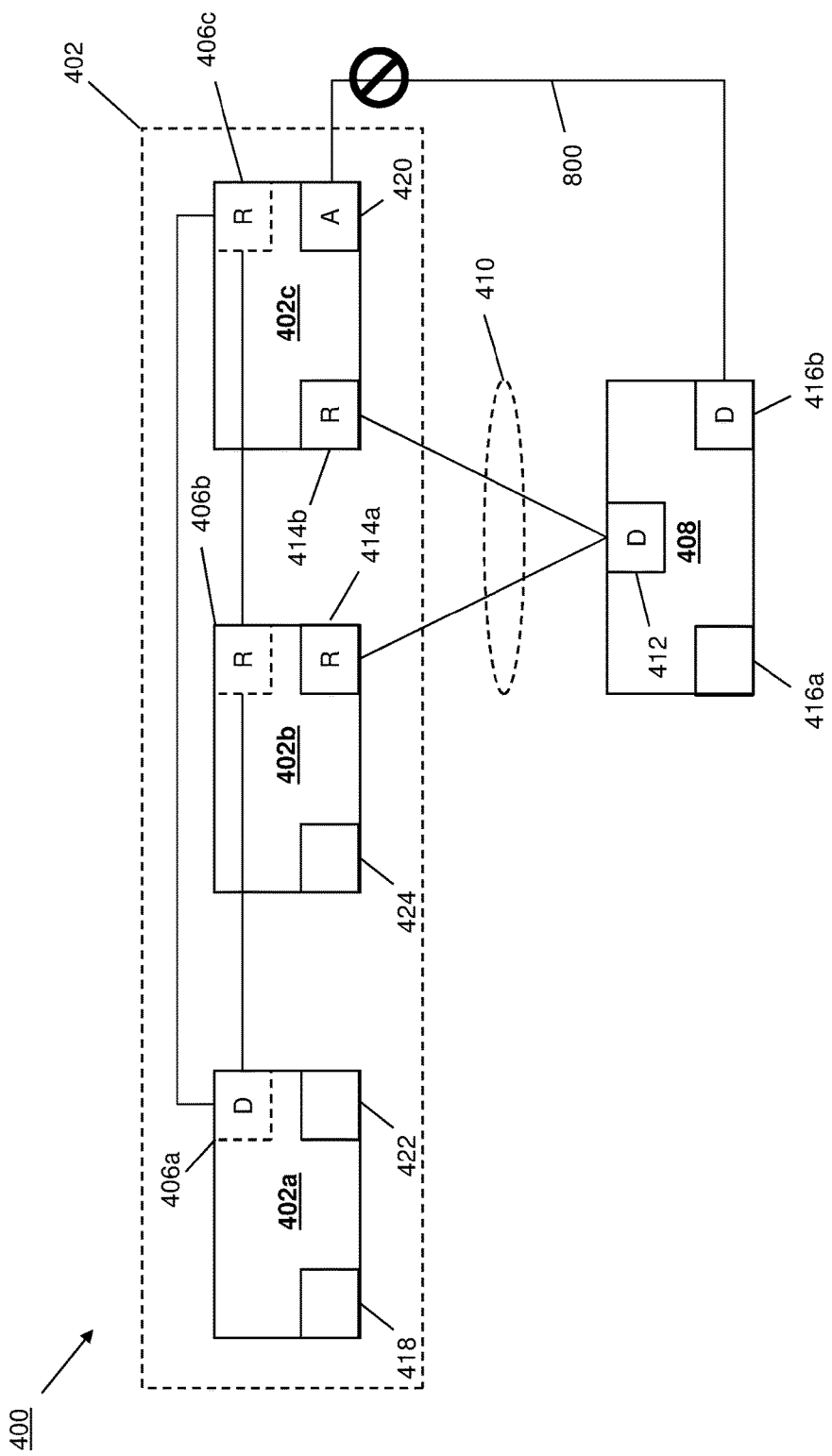
FIG. 9E is a schematic view illustrating an embodiment of the n-node link aggregation system of FIG. 4B during the method of FIG. 8.

The method 800 then proceeds to block 808 where the second virtual port on the second link aggregation node device is redesignated as a root port and the non-LAG port on the second link aggregation node device is redesignated as an alternate port. In an embodiment, at block 808, the spanning tree protocol engine 506 running on the device(s) in the spanning tree enabled n-node link aggregation system 400 will operate to redesignate the virtual port 406*c* in the link aggregation node device 402*c* from an alternate port (indicated by the "A" in the virtual port 406*c* illustrated in FIG. 9D) to a root port (indicated by the "R" in the virtual port 406*c* illustrated in FIG. 9E), while also redesignating the non-LAG port 420 in the link aggregation node device 402*c* from a root port (indicated by the "R" in the non-LAG port 420 illustrated in FIG. 9D) to an alternate port (indicated by the "A" in the non-LAG port 420 illustrated in FIG. 9E.) FIG. 9E illustrates how designation of the non-LAG port 420 in the link aggregation node device 402*c* as an alternate port causes the non-LAG port 420 to be blocked as indicated by the "no"/circle/backslash symbol. Thus, the system and methods of the present disclosure provide a spanning tree protocol topology convergence when a networking device that is outside of the link aggregation fabric is provided as a root bridge and coupled to the link aggregation fabric via a LAG and a non-LAG link, while ensuring that links between the link aggregation node devices are not blocked (e.g., via the redesignation of the virtual port 406*c* on the link aggregation node device 402*c* from an alternate port to a root port), and ensuring that loops will be blocked (e.g., via the blocking of the non-LAG port 420 on the link aggregation node device 402*c* due to its redesignation from a root port to an alternate port.)

Figure 10:
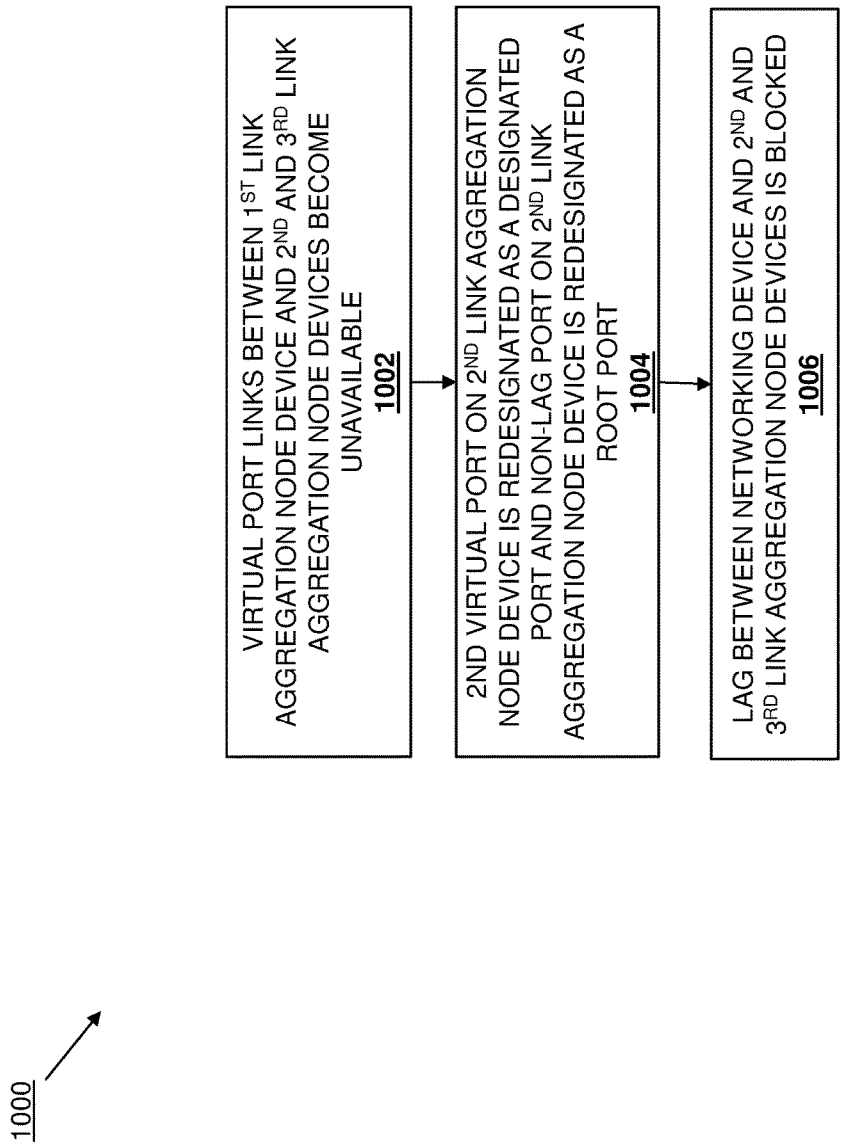
FIG. 10 is a flow chart illustrating an embodiment of a method for enabling the spanning tree protocol in an n-node link aggregation system.

Referring now to FIG. 10, a specific embodiment of a method 1000 for enabling the spanning tree protocol in an n-node link aggregation system is illustrated. The system and method 1000 are described below to provide an example of the use of the teachings of the present disclosure to address link failure between primary and secondary link aggregation node devices in a link aggregation fabric following a spanning tree protocol topology convergence without loops when a networking device outside of the link aggregation fabric is provided as a root bridge and connected to the link aggregation node devices via a LAG and a non-LAG link. This example continues with the spanning tree enabled n-node link aggregation system 400 provided in the state described above following block 808 of the method 800 and, as such, the virtual ports, LAG ports, and non-LAG ports illustrated in FIG. 11A include the same designations as those illustrated in FIG. 9E. In addition, a backup link 1000 is provided between the backup ports 422 and 424 on the link aggregation node devices 402*a* and 402*b*, and one of skill in the art in possession of the present disclosure will recognize that the backup link 1000 may be provided in the other methods described herein while remaining within the scope of the present disclosure as well. While the backup link 1000 is discussed below as being provided for use in detecting whether a primary link aggregation node is operating, other uses for the backup link 1000 will fall within the scope of the present disclosure as well.

Figure 11A:
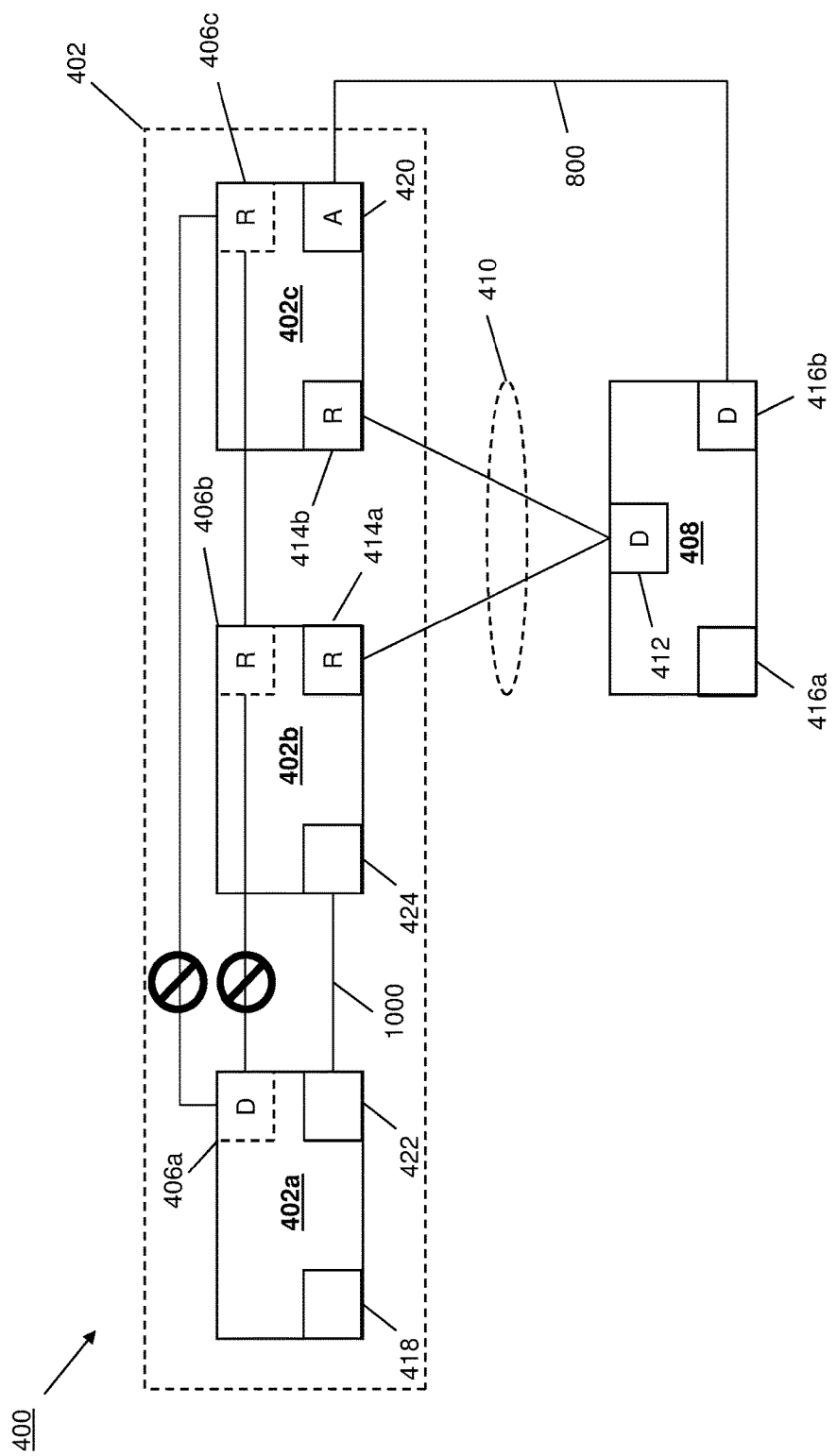
FIG. 11A is a schematic view illustrating an embodiment of the n-node link aggregation system of FIG. 4B during the method of FIG. 10.

The method 1000 begins at block 1002 where a virtual links between a first link aggregation node device and second and third link aggregation node devices become unavailable. In an embodiment, at block 1002, the virtual links between the virtual port 406*a* on the link aggregation node device 402*a* (which is acting as the primary link aggregation node device) and each respective virtual port 406*b* on the link aggregation node device 402*b* and virtual port 406*c* on the link aggregation node device 402*c* become unavailable. For example, with reference to FIG. 4A, the ICLs 404 between the link aggregation node device 402*a* and each of the link aggregation node devices 402*b* and 402*c* may "go down", become disconnected, or otherwise become unavailable for communications between the link aggregation node device 402*a* and each of the link aggregation node devices 402*b* and 402*c*. FIG. 11A illustrates the spanning tree enabled n-node link aggregation system 400 with each of the virtual links between the virtual port 406*a* on the link aggregation node device 402*a* and each respective virtual port 406*b* on the link aggregation node device 402*b* and the virtual port 406*c* on the link aggregation node device 402*c* unavailable via a "no"/circle/backslash symbol. For example, a virtual port on a link aggregation node device may be made unavailable when each of the ICLs/VLTi's available to that link aggregation node device are unavailable, while that virtual port may be made available if at least one ICL/VLTi is available.

Figure 11B:
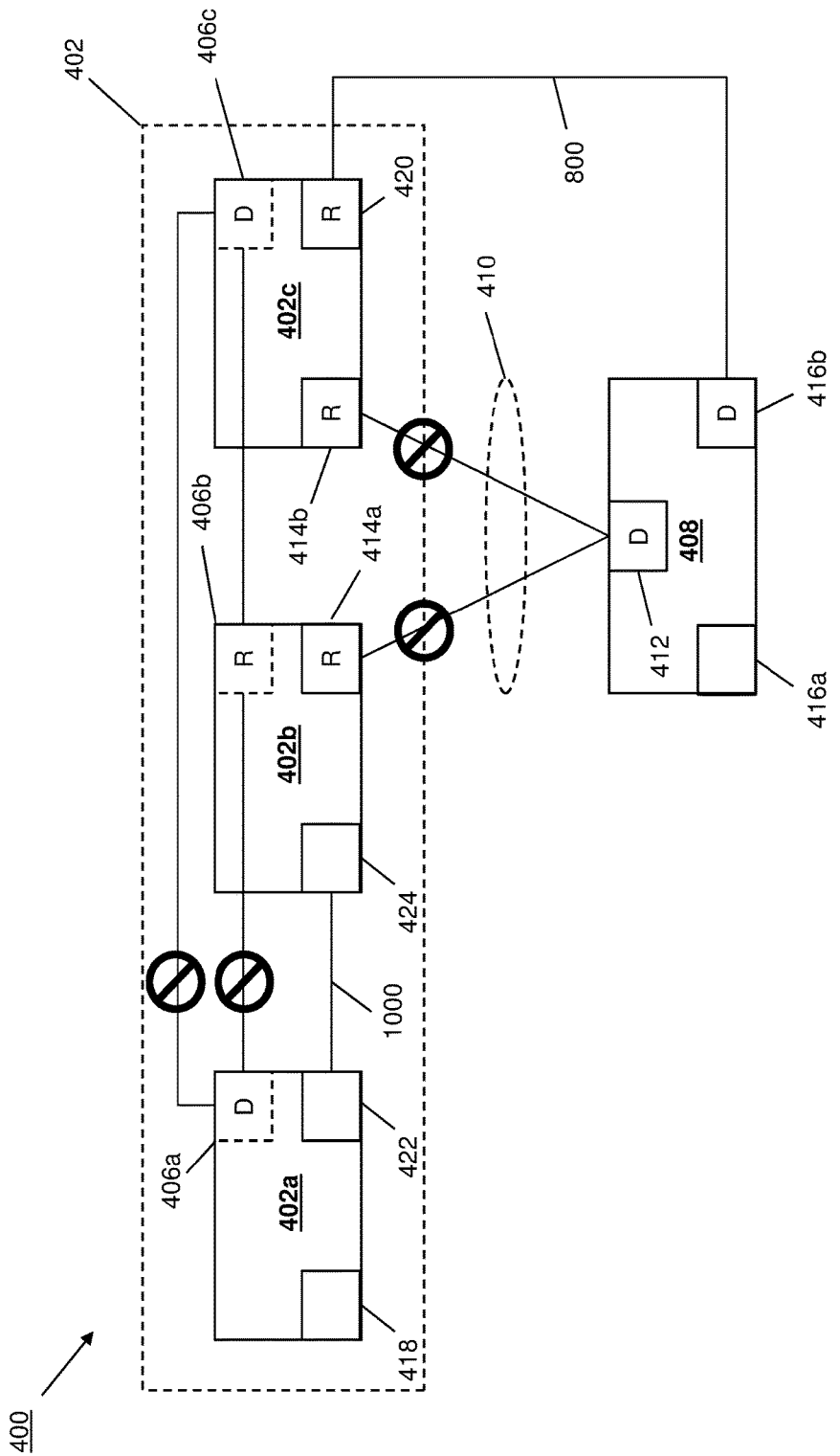
FIG. 11B is a schematic view illustrating an embodiment of the n-node link aggregation system of FIG. 4B during the method of FIG. 10.

The method 1000 then proceeds to block 1004 where a second virtual port on the second link aggregation node device is redesignated as a designated port and a non-LAG port on the second link aggregation node device is redesignated as a root port. In an embodiment, at block 1004, the spanning tree protocol engine 506 running on the device(s) in the spanning tree enabled n-node link aggregation system 400 will operate to redesignate the virtual port 406*c* in the link aggregation node device 402*c* from a root port port (indicated by the "R" in the virtual port 406*c* illustrated in FIG. 11A) to a designated port (indicated by the "D" in the virtual port 406*c* illustrated in FIG. 11B), while also redesignating the non-LAG port 420 in the link aggregation node device 402*c* from an alternate port (indicated by the "A" in the non-LAG port 420 illustrated in FIG. 11A) to a root port (indicated by the "R" in the non-LAG port 420 illustrated in FIG. 11B.) For example, state event machines operating in the link aggregation node device 402*c* and the networking device 408 may cause the re designation of the designated ports, root ports, and alternate ports discussed above. One of skill in the art in possession of the present disclosure will recognize that such conventional operation of the spanning tree protocol would create a loop (i.e., due to the redesignation of the non-LAG port 420 on the link aggregation node device 402c from an alternate port to a root port), and that block 1006 of the method is performed to prevent such loops from occurring.

The method 1000 then proceeds to block 1006 where the LAG between the networking device and the second and third link aggregation node devices is blocked. In an embodiment, the link aggregation node device 402b (operating as the secondary link aggregation node device in this example), may determine that the link aggregation node device 402a (operating as the primary link aggregation node device in this example) is "alive" (i.e., operating) via the backup link 1000 even through the link aggregation node device 402a is unavailable via its virtual port link. In such a situation, the VLT LAG port role/state is in control of the link aggregation node device 402a (i.e., because it is the primary link aggregation node device), but the link aggregation node device 402a is unable to control that VLT LAG port role state (i.e., because the ICLs/VLTi to the secondary link aggregation node device are down or otherwise unavailable, preventing the exchange of BPDUs that would allow the changing of the VLT LAG port role state(s)). As such, in conventional systems the LAG ports 414a and 414b would remain in a root role/state, while the link aggregation node device 402c would open up non-LAG port 420 (i.e., because it is receiving the best root information) and create a loop.

The method 1000 avoids loops by, at block 1006, having the secondary link aggregation node device 402b in the spanning tree enabled n-node link aggregation system 400 operate to block each of the LAG links that provide the LAG 410 between the LAG port(s) 412 on the networking device 408 and the LAG ports 414a and 414b on each of the link aggregation node devices 402b and 402c, respectively. For example, in response to determining that the primary link aggregation node device is not accessible via its virtual port (but is accessible via the backup link 1000), at block 1006 the link aggregation node device 402b operating as a secondary link aggregation node device may cause the LAG links that provide the LAG 410 between the LAG port(s) 412 on the networking device 408 and the LAG ports 414a and 414b on each of the link aggregation node devices 402b and 402c to shut down (e.g., put in an "operationally down" state in which no data and/or control packets may be transmitted via those LAG ports.) Thus, the system and methods of the present disclosure addresses link failure between primary and secondary link aggregation node devices in a link aggregation fabric following a spanning tree protocol topology convergence without loops when a networking device outside of the link aggregation fabric is provided as a root bridge and connected to the link aggregation node devices via a LAG and a non-LAG link (e.g., via the blocking of a LAG between the networking device 408 and the link aggregation node devices 402b and 402c following the redesignation of the non-LAG port 420 on the link aggregation node device 402c from an alternate port to a root port, which would otherwise cause a loop in the spanning tree enabled n-node link aggregation system 400.)

Figure 12A:
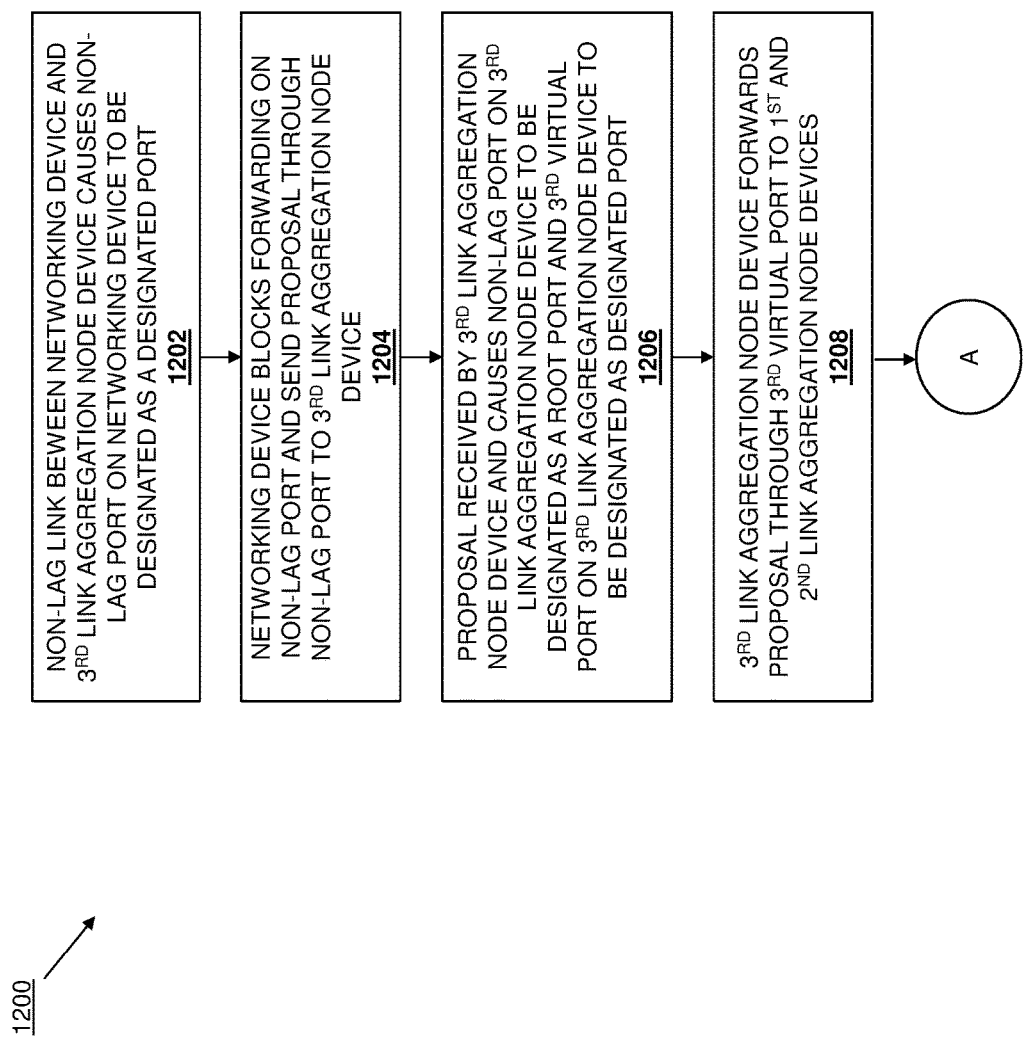
FIGS. 12A and 12B are a flow chart illustrating an embodiment of a method for enabling the spanning tree protocol in an n-node link aggregation system.
Figure 12B:
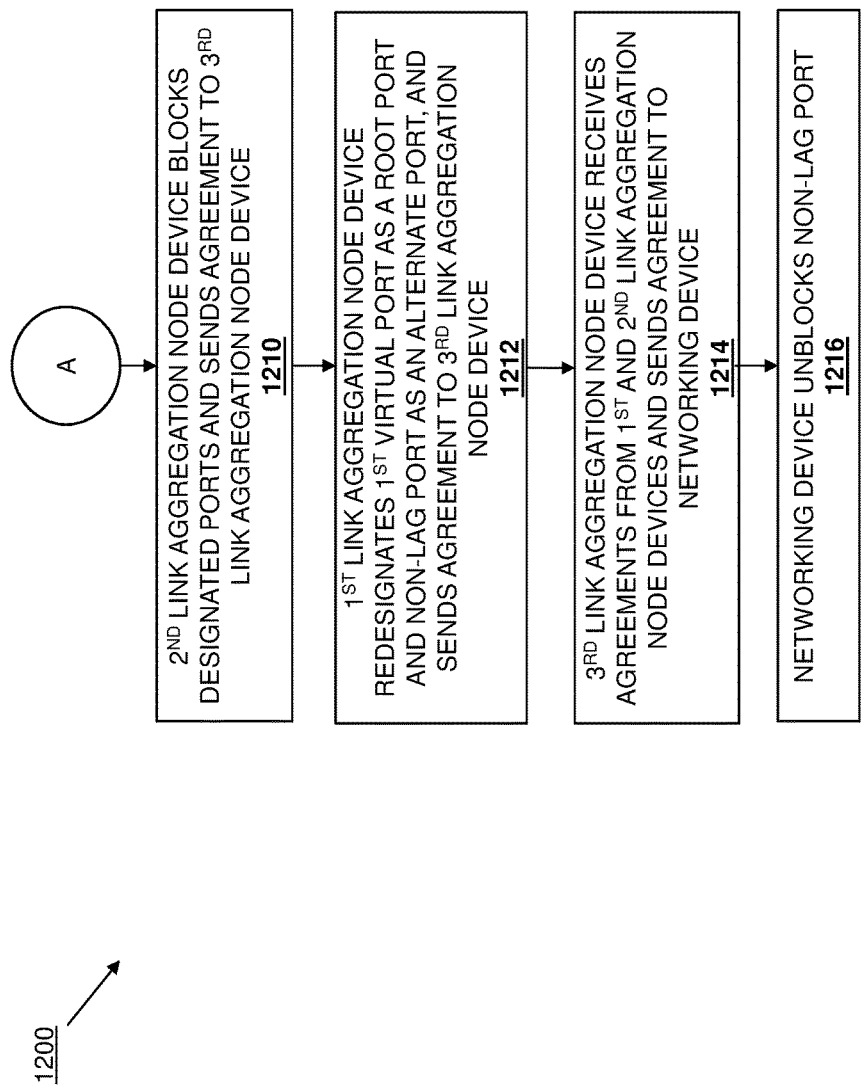

Referring now to FIGS. 12A and 12B, a specific embodiment of a method 1200 for enabling the spanning tree protocol in an n-node link aggregation system is illustrated. The system and method 1200 are described below to provide an example of the use of the teachings of the present disclosure to provide a spanning tree protocol topology convergence without loops when a networking device outside of the link aggregation fabric is provided as a root bridge and connected to the link aggregation node devices via multiple non-LAG links. In addition, the system and method 1200 also provide an example of a proposal and agreement mechanism via the virtual ports of the present disclosure. In conventional spanning tree protocol proposal and agreement mechanisms, prior to designating a new root port, the spanning tree protocol ensures that that root port will not cause a loop. One of skill in the art in possession of the present disclosure will recognize that this may be accomplished by blocking all designated ports and sending a proposal over those designated ports when new root information is received (e.g., by setting a sync flag to "true"), and then unblocking those designated ports when an agreement is received from the new (peer) root port. However, as discussed below, the proposal and agreement mechanism via the virtual ports of the present disclosure does not operate to put a virtual port on a link aggregation node device that has been designated as designated port into a forwarding state when a non-virtual port on that link aggregation node device is designated as a root port, as doing so creates a loop. Instead, the virtual port on that link aggregation node device will only be put into a forwarding state after receiving agreements from all the peer link aggregation nodes, as discussed in detail below. In some embodiments, ICLs may be temporarily blocked (e.g., on the order of milliseconds) during the proposal and agreement mechanism.)

Figure 13A:
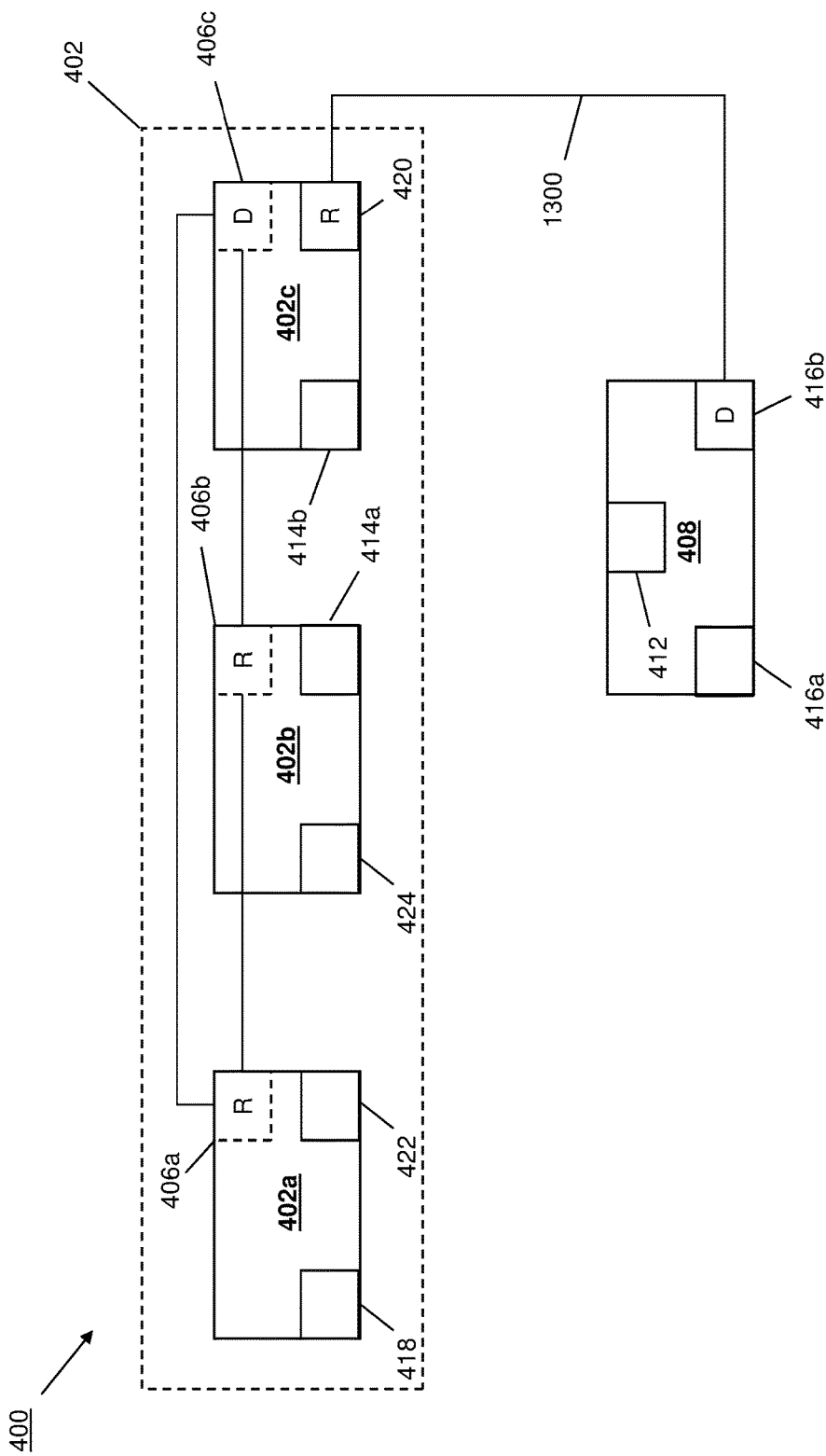
FIG. 13A is a schematic view illustrating an embodiment of the n-node link aggregation system of FIG. 4B during the method of FIGS. 12A and 12B.

Referring to FIG. 13A, prior to or during the method 1200, the networking device 408 is connected to the link aggregation node device 402c via a non-LAG link 1300 between the non-LAG port 416b on the networking device 408 and the non-LAG link 420 on the link aggregation node device 402c. For the purposes of this discussion, the non-LAG link 1300 has a path cost of fifty. Furthermore, it is noted that, in this embodiment, the networking device 408 is not connected to the link aggregation fabric 402 by a LAG (i.e., the LAG 410 discussed above), and is a higher priority device than any of the link aggregation node devices in the link aggregation fabric 402. As such, the spanning tree protocol engine 506 running on the device(s) in the spanning tree enabled n-node link aggregation system 400 may designate the networking device 408 as the root bridge (e.g., because the networking device is the highest priority device in the spanning tree enabled n-node link aggregation system 400, as discussed above).

In addition, the spanning tree protocol engine 506 running on the device(s) in the spanning tree enabled n-node link aggregation system 400 will operate to designate the non-LAG port 416b on the networking device 408 as a designated port (indicated by the "D" in the non-LAG port 416b illustrated in FIG. 9B), while designating the non-LAG port 420 in the link aggregation node device 402c as a root port (indicated by the "R" in the non-LAG port 420 illustrated in FIG. 13A), designating the virtual port 406c in the link aggregation node device 402c as a designated port (indicated by the "D" in the virtual port 406c illustrated in FIG. 13A), and designating the virtual ports 406a and 406b in the link aggregation node devices 402a and 402b, respectively, as root ports (indicated by the "R" in the virtual ports 406a and 406b illustrated in FIG. 13A.)

Figure 13B:
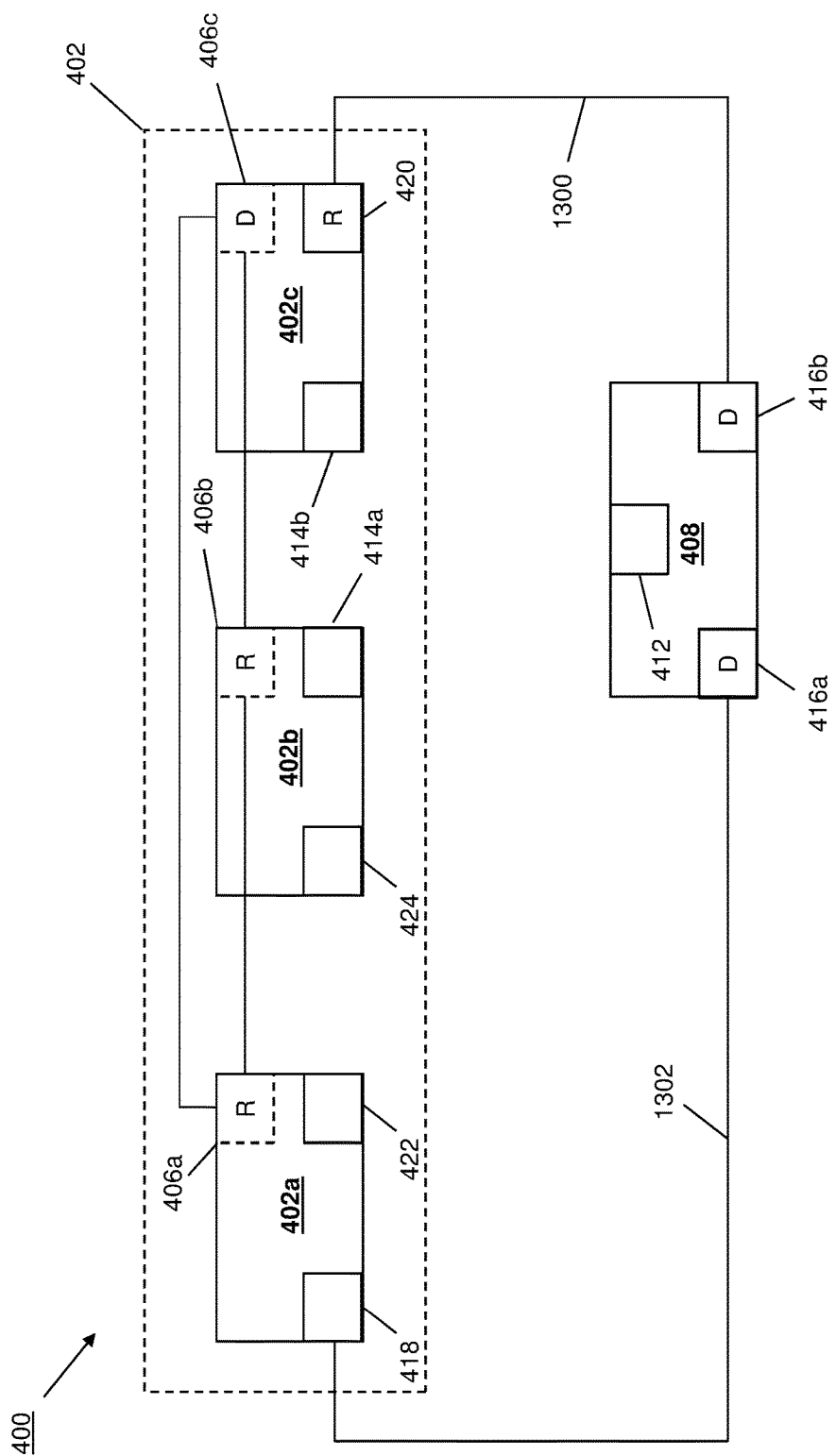
FIG. 13B is a schematic view illustrating an embodiment of the n-node link aggregation system of FIG. 4B during the method of FIGS. 12A and 12B.

Referring now to FIG. 13B, the method 1200 begins at block 1202 where a non-LAG link between a networking device and a third link aggregation node device causes a non-LAG port on the networking device to be designated as an alternate port. In an embodiment, at block 1202, a non-LAG link 1302 is provided between the non-LAG port 416a on the networking device 408 and the non-LAG port 418 on the link aggregation node device 402a. For the purposes of this discussion, the non-LAG link 1302 has a path cost of ten, which is a lower path cost than the non-LAG link 1300. In response to the non-LAG link 1302 being provided between the non-LAG port 416a on the networking device 408 and the non-LAG port 418 on the link aggregation node device 402a, the spanning tree protocol engine 506 running on the device(s) in the spanning tree enabled n-node link aggregation system 400 will operate to designate the non-LAG port 416a on the networking device 408 as a designated port (indicated by the "D" in the non-LAG port 416a illustrated in FIG. 13B.)

Figure 13C:
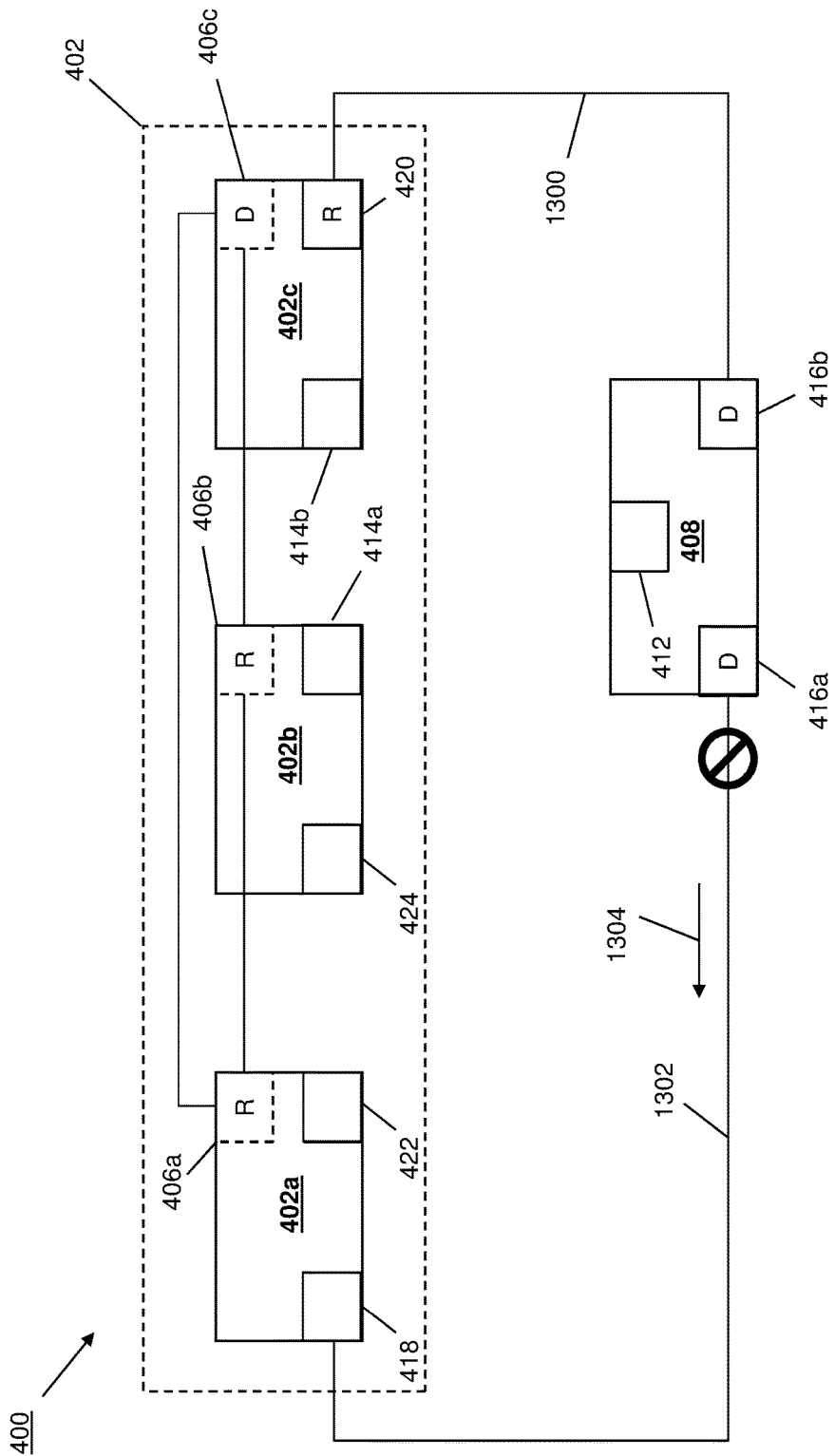
FIG. 13C is a schematic view illustrating an embodiment of the n-node link aggregation system of FIG. 4B during the method of FIGS. 12A and 12B.

Referring now to FIG. 13C, the method 1200 then proceeds to block 1204 where the networking device blocks forwarding on the non-LAG port and sends a proposal through the non-LAG port to a third link aggregation node device. In an embodiment, at block 1204, the networking device 408 will operate to block the non-LAG port 416a (as indicated by the "no"/circle/backslash symbol), and send a control message 1304 that includes a proposal over the non-LAG link 1302 to the link aggregation node device 402a.

Figure 13D:
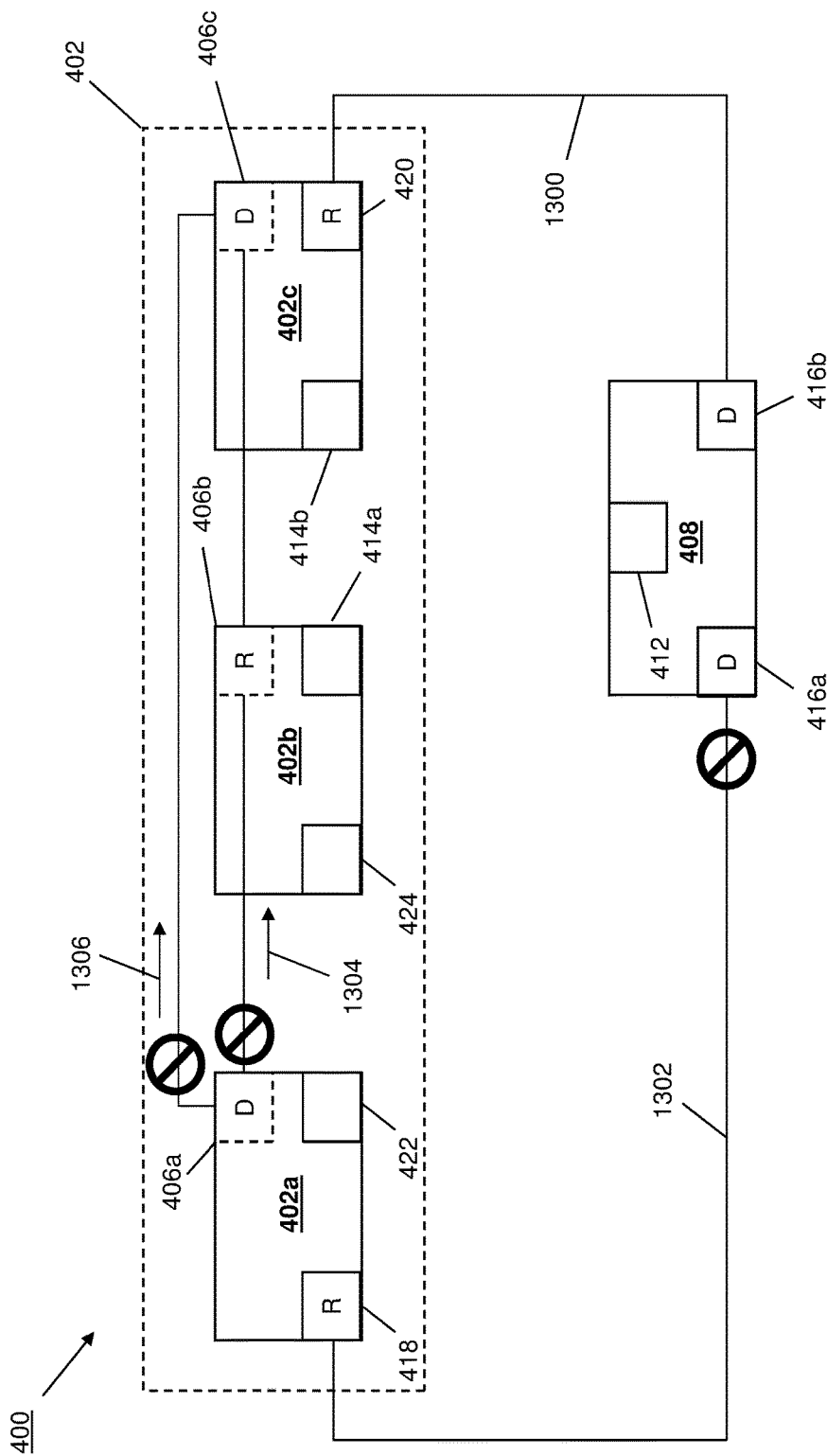
FIG. 13D is a schematic view illustrating an embodiment of the n-node link aggregation system of FIG. 4B during the method of FIGS. 12A and 12B.

Referring now to FIG. 13D, the method 1200 then proceeds to block 1206 where the proposal is received by the third link aggregation node device and causes a non-LAG port on the third link aggregation node device to be designated as a root port and a third virtual port on the third link aggregation node device to be designated as a designated port. In an embodiment, at block 1206, the link aggregation node device 402a receives the control message 1304 and, in response, designates the non-LAG port 418 on the link aggregation node device 402a a root port (indicated by the "R" in the non-LAG port 418 illustrated in FIG. 13D), and redesignates the virtual port 406a in the link aggregation node device 402a from a root port (indicated by the "R" in the virtual port 406a illustrated in FIG. 13C) to a designated port (indicated by the "D" in the virtual port 406a illustrated in FIG. 13D.) In addition, the virtual port 406a on the link aggregation node device 402a that has been designated as designated port is blocked (e.g., by setting a sync flag to "true") when the non-LAG port 418 on the link aggregation node device 402a is designated as a root port, as allowing that virtual port 406a to forward data would create a loop.

The method 1200 then proceeds to block 1208 where the third link aggregation node device sends a control message with the proposal through a third virtual port on the third link aggregation node device to the first and second link aggregation node devices. In an embodiment, at block 1208, the link aggregation node device 402a sends a control message 1304 including the proposal over the link between the virtual port 406a on the link aggregation node device 402a and each of the virtual port 406b on the link aggregation node device 402b and the virtual port 406c on the link aggregation node device 402b.

Figure 13E:
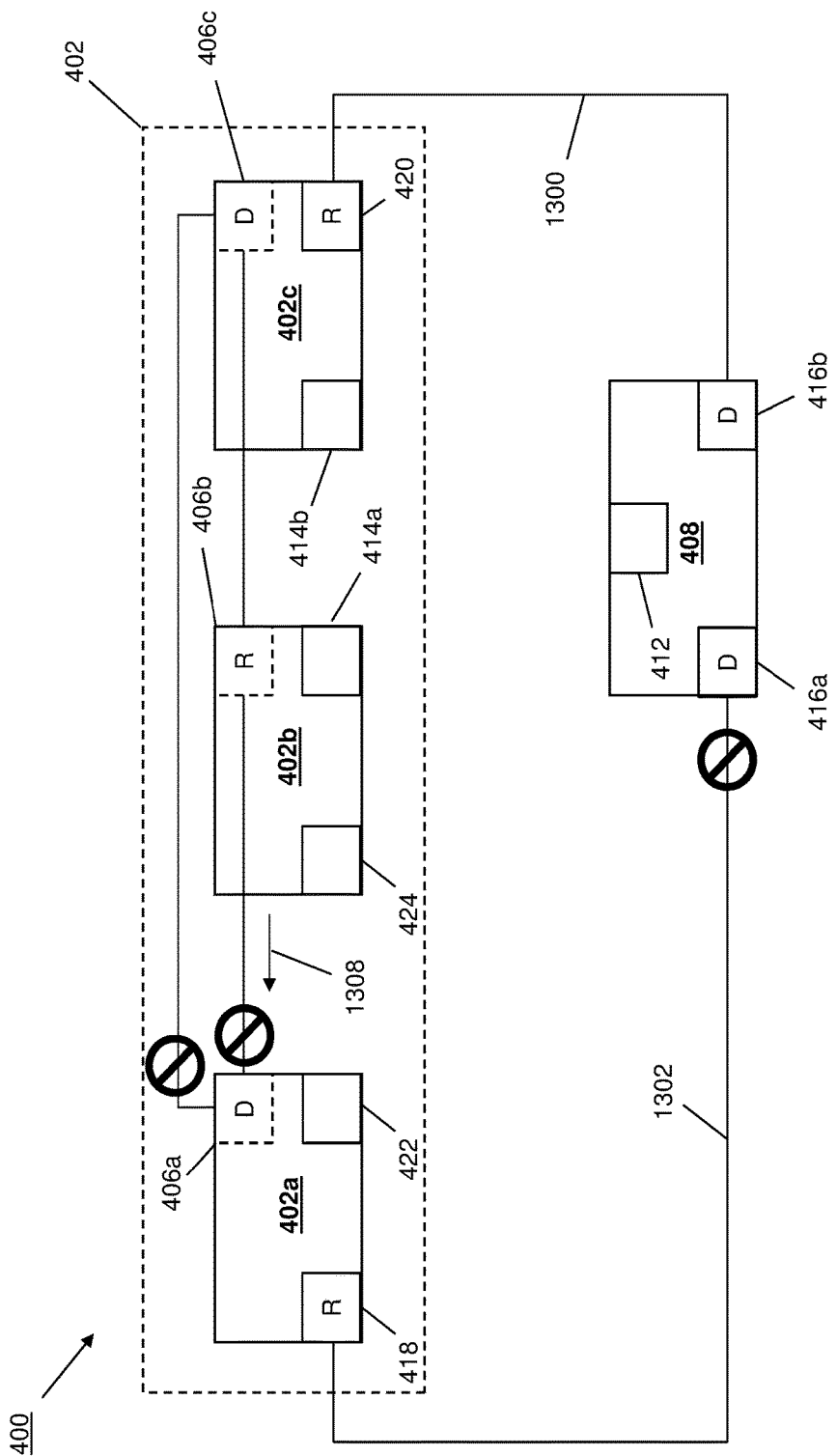
FIG. 13E is a schematic view illustrating an embodiment of the n-node link aggregation system of FIG. 4B during the method of FIGS. 12A and 12B.

Referring now to FIG. 13E, the method 1200 then proceeds to block 1210 where the second link aggregation node device blocks its designated ports and sends an agreement to the third link aggregation node device. In an embodiment, at block 1210, the link aggregation node device 402b receives the control message 1304 including the proposal through its virtual port 406b and, in response, blocks any designated ports on the link aggregation node device 402b (not illustrated), and sends a control message 1308 including an agreement over the link between the virtual port 406b on the link aggregation node device 402b and the virtual port 406a on the link aggregation node device 402a.

Figure 13F:
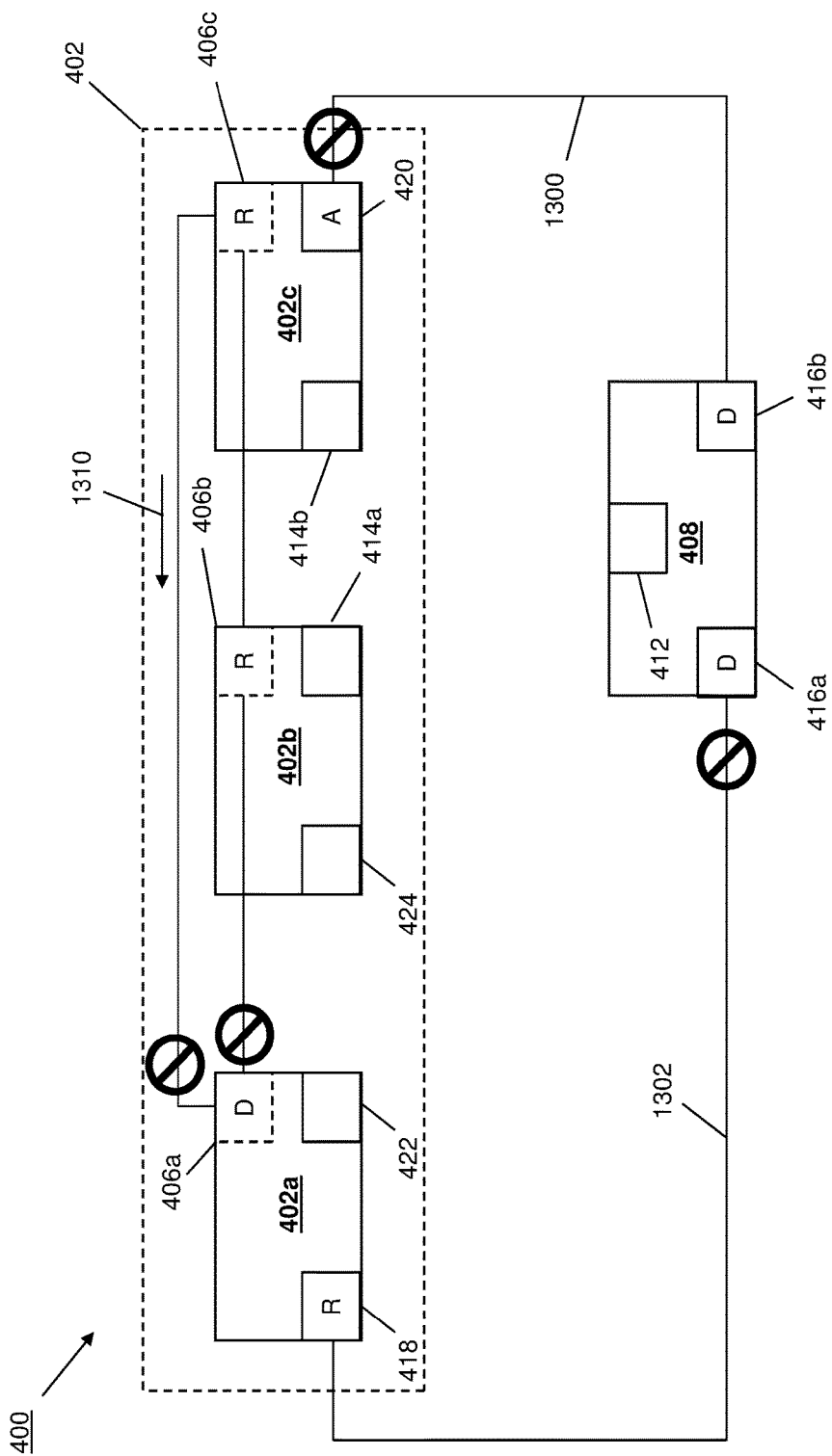
FIG. 13F is a schematic view illustrating an embodiment of the n-node link aggregation system of FIG. 4B during the method of FIGS. 12A and 12B.
Figure 13G:
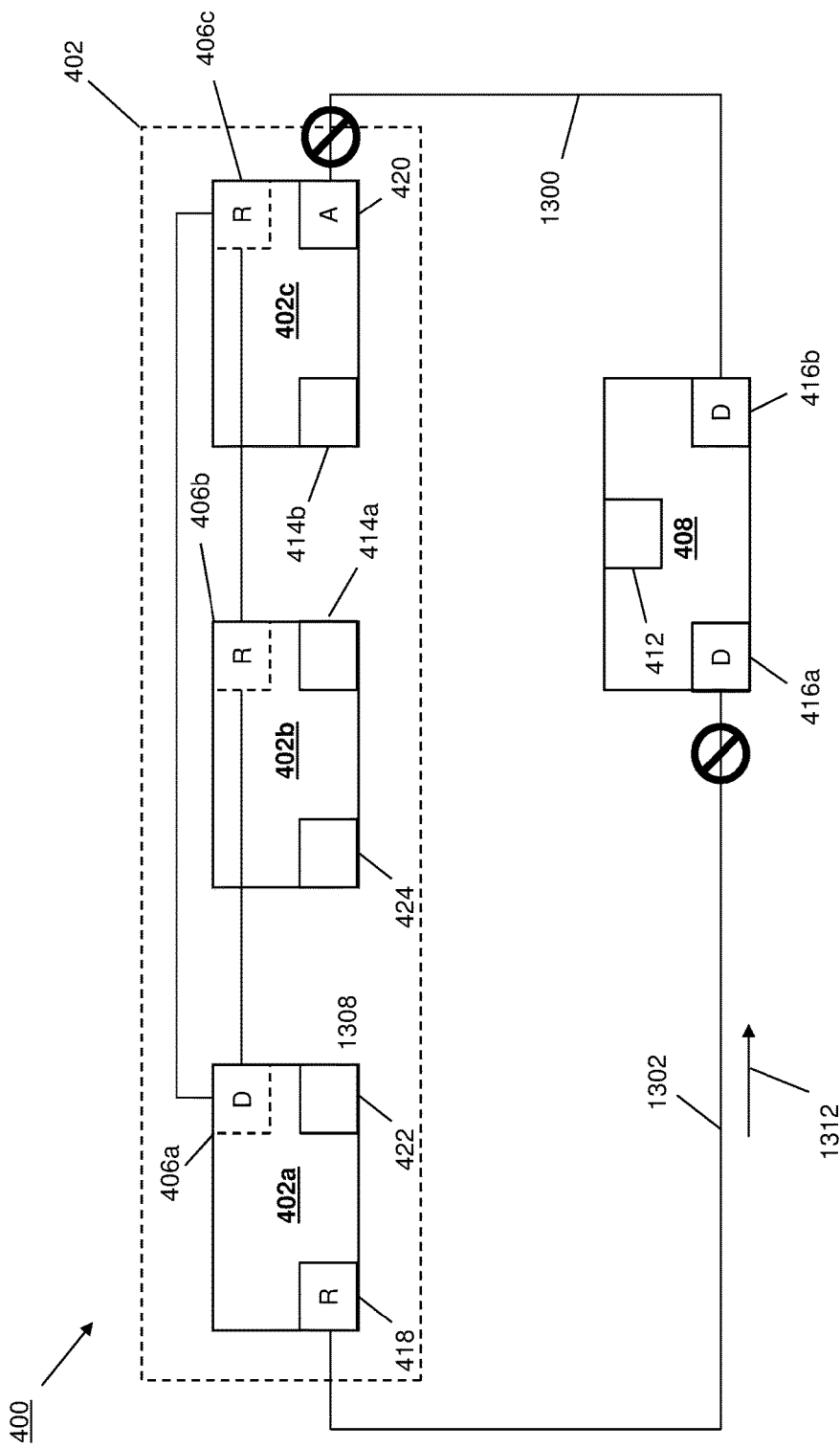
FIG. 13G is a schematic view illustrating an embodiment of the n-node link aggregation system of FIG. 4B during the method of FIGS. 12A and 12B.

Referring now to FIG. 13F, the method 1200 then proceeds to block 1212 where the first link aggregation node device redesignates its virtual port as a root port and its non-LAG port as an alternate port, and sends an agreement to the third link aggregation node device. In an embodiment, at block 1212, the link aggregation node device 402c receives the control message 1304 including the proposal through its virtual port 406c and, in response, redesignates the virtual port 406c on the link aggregation node device 402c from a designated port (indicated by the "D" in the virtual port 406c illustrated in FIG. 13E) to a root port (indicated by the "R" in the virtual port 406c illustrated in FIG. 13F), and redesignates the non-LAG port 420 in the link aggregation node device 402c from a root port (indicated by the "R" in the non-LAG port 420 illustrated in FIG. 13E) to an alternate port (indicated by the "A" in the non-LAG port 420 illustrated in FIG. 13F.) FIG. 13F illustrates how redesignation of the non-LAG port 420 in the link aggregation node device 402c to an alternate port causes the non-LAG port 420 to be blocked as indicated by the "no"/circle/backslash symbol. Furthermore, at block 1212, the link aggregation node device 402c then sends a control message 1310 including an agreement over the link between the virtual port 406c on the link aggregation node device 402c and the virtual port 406a on the link aggregation node device 402a Referring now to FIG. 13G, the method 1200 then proceeds to block 1214 where the third link aggregation node device receives agreements from the first and second link aggregation nodes devices and sends an agreement to the networking device. In an embodiment, at block 1214, the link aggregation node device 402a receives the control messages 1308 and 1310 from the link aggregation node devices 402b and 402c (i.e., via its virtual port 406a) and, in response, send a control message 1312 including an agreement over the non-LAG link 1302 between the non-LAG port 418 on the link aggregation node device 402a and the non-LAG port 416a on the networking device 408. Furthermore, as illustrated in FIG. 13G, in response to receiving the agreement from each of the link aggregation node devices 402b and 402c, the link aggregation node device 402a unblocks its virtual port 406a and puts it in a forwarding state.

Figure 13H:
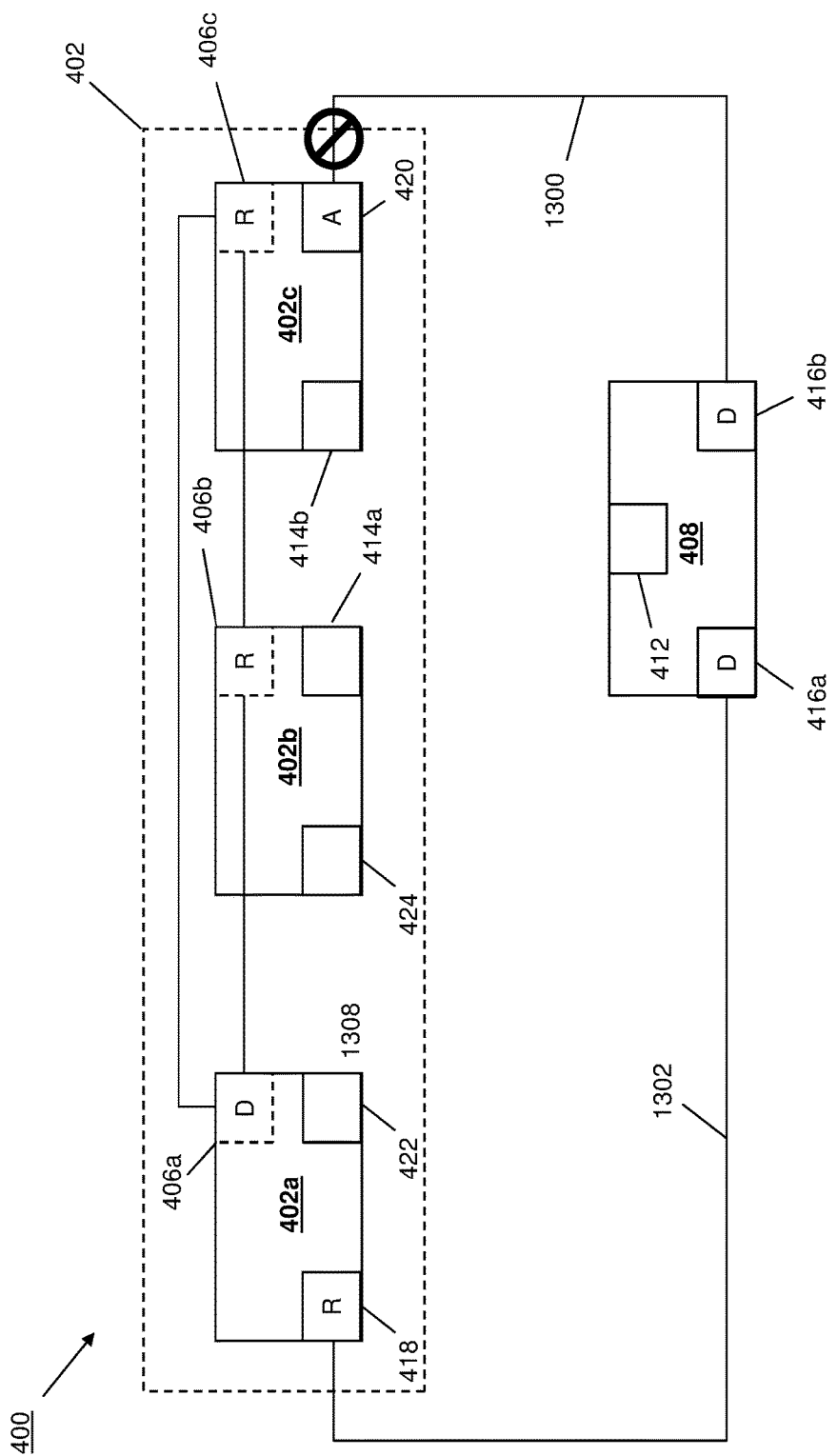
FIG. 13H is a schematic view illustrating an embodiment of the n-node link aggregation system of FIG. 4B during the method of FIGS. 12A and 12B.

Referring now to FIG. 13H, the method 1200 then proceeds to block 1216 where the networking device unblocks the non-LAG port on the networking device. In an embodiment, at block 1216, the networking device receives the control message 1312 from the link aggregation node device 402a and, in response, unblocks the non-LAG port 416a on the networking device 408 that was designated as a designated port. Thus, the system and methods of the present disclosure provide a spanning tree protocol topology convergence without loops when a networking device outside of the link aggregation fabric is provided as a root bridge and connected to the link aggregation node devices via multiple non-LAG link by not putting a virtual port on a link aggregation node device that has been designated as designated port into a forwarding state when a non-virtual port on that link aggregation node device is designated as a root port, and instead only putting that virtual port on that link aggregation node device into a forwarding state after receiving agreements from all the peer link aggregation nodes. Furthermore, one of skill in the art in possession of the present disclosure will recognize how this proposal agreement mechanism may operate when new link aggregation node devices are added to the link aggregation fabric.

In many embodiments of the present disclosure, the spanning tree protocol engines running on the devices in the spanning tree enabled n-node link aggregation system 400 will be aware of each of the link aggregation node devices in the link aggregation fabric, as the link aggregation fabric manager will publish/update the system topology whenever there is a change. As such, if any of the link aggregation node devices become unavailable while a link aggregation node device (e.g., the link aggregation node device 402a in the example above) is waiting for an agreement to a proposal, an agreement from that unavailable link aggregation node may not be received, and the spanning tree protocol engines running on the spanning tree enabled n-node link aggregation system 400 will be waiting for that agreement (i.e., in order to unblock the non-LAG port 416 on the networking device 408 in the example above.) In such situations, the spanning tree protocol engines running on the spanning tree enabled n-node link aggregation system 400 will cease waiting for agreement from the failed node once the link aggregation fabric manager publishes/updates the system topology. In some embodiments, the spanning tree protocol engines running on the spanning tree enabled n-node link aggregation system 400 may set a timer after sending a proposal, and if agreements are not received by the expiration of that timer, the virtual port may be set to a forwarding state.

Thus, the system and methods of the present disclosure provide for the enablement of the spanning tree protocol on any n-node link aggregation fabric by allowing the spanning tree protocol to visualize that n-node link aggregation fabric topology as n-nodes connected to a single network without a loop (i.e., via the virtual ports discussed above.) As such, the spanning tree protocol only operates to block non-ICL links for loop prevention. The systems and methods provide spanning tree enabled link aggregation fabrics that are easier to design and implement, and can be used to realize distributed spanning tree protocol operation in a chassis or stacking environment.

One of skill in the art will recognize how the teachings of the present disclosure will enable responses to a variety of failure scenarios. For example, in the spanning tree enabled n-node link aggregation system 400 of FIG. 9A with the link aggregation node device 402b acting as a secondary link aggregation node device that has a priority necessary to become a root bridge, the failure of the link aggregation node device 402a acting as a primary link aggregation node device and operating as the root bridge will result in that link aggregation node device 402b being designated as the primary link aggregation node device and the root bridge, along with the redesignation of the virtual port 406b on the link aggregation node device 402b from a root port to a designated port. Similarly, in the spanning tree enabled n-node link aggregation system 400 of FIG. 9A with the networking device 408 having a priority necessary to become a root bridge, the failure of a link aggregation node device 402a operating as the root bridge will result in the link aggregation node device 402b being designated as the primary link aggregation node device, the networking device 408 being designated as the root bridge, along with the redesignation of the LAG port 412 on the networking device 408 from a root port to a designated port, the redesignation of LAG ports 414a and 414b on the link aggregation node devices 402b and 402c from designated ports to root ports, and the redesignation of the virtual port 406b on link aggregation node device 402b from a root port to a designated port. While a few failure scenarios have been described, a wide variety of failure scenarios may be addressed by the teachings of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A spanning tree enabled n-node link aggregation system, comprising:
    a plurality of link aggregation node devices that include:
        a first link aggregation node device that includes a first virtual port and that has the highest priority of the plurality of link aggregation node devices; and
        a second link aggregation node device that includes a Link Aggregation Group (LAG) port, a non-LAG port, and a second virtual port that is coupled to the first virtual port included on the first link aggregation node device; and
    a spanning tree protocol engine running on the each of the plurality of link aggregation node devices, wherein the spanning tree protocol engine is configured to:
        designate the first link aggregation node device as a root bridge based on the first link aggregation node device having the highest priority of the plurality of link aggregation node devices and, in response, designate the first virtual port as a designated port and the second virtual port as a root port;
        determine that a networking device that is coupled to the LAG port on the second link aggregation node device has a higher priority than the first link aggregation node device and, in response, designate the networking device as the root bridge; and
        determine that a non-LAG link provided between the networking device and the second link aggregation node device has caused the second virtual port to be redesignated as an alternate port and the non-LAG port to be designated as a root port and, in response, redesignate the second virtual port as a root port and redesignate the non-LAG port as an alternate port.

2. The system of claim 1, wherein the spanning tree protocol engine is configured to:
    designate the LAG port on the second link aggregation node device as a root port in response to designating the networking device as the root bridge.

3. The system of claim 1, wherein the spanning tree protocol engine is configured to:
    determine that a virtual port link between the first virtual port and the second virtual port has become unavailable and caused the second virtual port to be redesignated as a designated port and the non-LAG port to be redesignated as a root port and, in response, block the LAG port.

4. The system of claim 3, wherein the first link aggregation node device is configured to control the second link aggregation node device while the virtual port link is unavailable via a backup link to a third link aggregation node device that is included in the plurality of link aggregation node devices and that is connected to the second link aggregation node device.

5. The system of claim 1, wherein the spanning tree protocol engine is configured to:
    create a control plane group for the plurality of link aggregation node devices; and
    publish a control message to the control plane group such that each of the plurality of link aggregation node devices receives a copy of the control message.

6. The system of claim 1, wherein the first link aggregation node device is a primary link aggregation node device, the second link aggregation node device is a secondary link aggregation node device, and the first link aggregation node device is the only link aggregation node device of the plurality of link aggregation node devices that is configured to control the designation of the LAG port on the second link aggregation node device.

7. The system of claim 1, wherein the determining that the non-LAG link provided between the networking device and the second link aggregation node device has caused the second virtual port to be redesignated as an alternate port and the non-LAG port to be designated as a root port includes:
  determining that a State Event Machine (SEM) is attempting to assign an alternate role for the second virtual port and a root role for the non-LAG port.

8. An Information Handling System (IHS), comprising:
  a communication subsystem that provides a Link Aggregation Group (LAG) port, a non-LAG port, and a first virtual port;
  a processing system that is coupled to the communication subsystem, and
  a memory system that is coupled to the processing system and that includes instructions that, when executed by the processing system, cause the processing system to provide a spanning tree protocol engine that is configured to:
    determine that a link aggregation node device including a second virtual port coupled to the first virtual port has been designated as a root bridge and, in response, designate the first virtual port as a root port;
    determine that a networking device that is coupled to the LAG port has a higher priority than the link aggregation node device and has been designated as the root bridge; and
    determine that a non-LAG link provided between the networking device and the non-LAG port has caused the first virtual port to be redesignated as an alternate port and the non-LAG port to be designated as a root port and, in response, redesignate the first virtual port as a root port and redesignate the non-LAG port as an alternate port.

9. The IHS of claim 8, wherein the spanning tree protocol engine is configured to:
  designate the LAG port as a root port in response to the networking device being designated as the root bridge.

10. The IHS of claim 8, wherein the spanning tree protocol engine is configured to:
  determine that a virtual port link between the first virtual port and the second virtual port has become unavailable and caused the first virtual port to be redesignated as a designated port and the non-LAG port to be redesignated as a root port and, in response, block the LAG port.

11. The IHS of claim 10, wherein the spanning tree protocol engine is configured to:
  create a control plane group for a plurality of link aggregation node devices that includes the link aggregation node device; and
  publish a control message to the control plane group such that each of the plurality of link aggregation node devices receives a copy of the control message.

12. The IHS of claim 8, wherein the link aggregation node device is a primary link aggregation node device and the only link aggregation node device of a plurality of link aggregation node devices that is configured to control the designation of the LAG port on the communication subsystem.

13. The IHS of claim 8, wherein the determining that the non-LAG link provided between the networking device and the non-LAG port has caused the first virtual port to be redesignated as an alternate port and the non-LAG port to be designated as a root port includes:
  determining that a State Event Machine (SEM) is attempting to assign an alternate role for the first virtual port and a root role for the non-LAG port.

14. A method for enabling spanning tree protocol in an n-node link aggregation system, comprising:
  designating, by a spanning tree protocol engine, a first link aggregation node device as a root bridge based on the first link aggregation node device having the highest priority of a plurality of link aggregation node devices and, in response, designating a first virtual port on the first link aggregation node device as a designated port, and designating a second virtual port on a second link aggregation node device that is coupled to the first virtual port as a root port;
  determining, by the spanning tree protocol engine, that a networking device that is coupled to a LAG port on the second link aggregation node device has a higher priority than the first link aggregation node device and, in response, designating the networking device as the root bridge; and
  determining, by the spanning tree protocol engine, that a non-LAG link provided between the networking device and a non-LAG port on the second link aggregation node device has caused the second virtual port to be redesignated as an alternate port and the non-LAG port to be designated as a root port and, in response, redesignating the second virtual port as a root port and redesignating the non-LAG port as an alternate port.

15. The method of claim 14, further comprising:
  designating, by the spanning tree protocol engine, the LAG port on the second link aggregation node device as a root port in response to designating the networking device as the root bridge.

16. The method of claim 14, further comprising:
  determining, by the spanning tree protocol engine, that a virtual port link between the first virtual port and the second virtual port has become unavailable and caused the second virtual port to be redesignated as a designated port and the non-LAG port to be redesignated as a root port and, in response, blocking the LAG port.

17. The method of claim 16, wherein the first link aggregation node device is configured to control the second link aggregation node device while the virtual port link is unavailable via a backup link to a third link aggregation node device that is included in the plurality of link aggregation node devices and that is connected to the second link aggregation node device.

18. The method of claim 14, further comprising:
  creating, by the spanning tree protocol engine, a control plane group for the plurality of link aggregation node devices; and
  publishing, by the spanning tree protocol engine, a control message to the control plane group such that each of the plurality of link aggregation node devices receives a copy of the control message.

19. The method of claim 14, wherein the first link aggregation node device is a primary link aggregation node device, the second link aggregation node device is a secondary link aggregation node device, and the first link aggregation node device is the only link aggregation node device of the plurality of link aggregation node devices that is configured to control the designation of the LAG port on the second link aggregation node device.

20. The method of claim 14, wherein the determining that the non-LAG link provided between the networking device and the second link aggregation node device has caused the second virtual port to be redesignated as an alternate port and the non-LAG port to be designated as a root port includes:

determining that a State Event Machine (SEM) is attempting to assign an alternate role for the second virtual port and a root role for the non-LAG port.

* * * * *